(12) United States Patent
Higley et al.

(10) Patent No.: US 12,742,935 B2
(45) Date of Patent: Sep. 22, 2026

(54) ADAPTER SHUTTER ASSEMBLY WITH SHUTTER RETENTION CAP

(71) Applicant: US Conec Ltd., Hickory, NC (US)

(72) Inventors: Jason Higley, Hickory, NC (US); Darrell R. Childers, Hickory, NC (US); Craig M. Conrad, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 257 days.

(21) Appl. No.: 18/547,206

(22) PCT Filed: Mar. 14, 2022

(86) PCT No.: PCT/US2022/020259
§ 371 (c)(1),
(2) Date: Aug. 21, 2023

(87) PCT Pub. No.: WO2022/197638
PCT Pub. Date: Sep. 22, 2022

(65) Prior Publication Data

US 2024/0142715 A1 May 2, 2024

Related U.S. Application Data

(60) Provisional application No. 63/161,788, filed on Mar. 16, 2021.

(51) Int. Cl.
*G02B 6/38* (2006.01)

(52) U.S. Cl.
CPC ......... *G02B 6/3825* (2013.01); *G02B 6/3821* (2013.01); *G02B 6/3831* (2013.01);
(Continued)

(58) Field of Classification Search
CPC .. G02B 6/3821; G02B 6/3825; G02B 6/3831; G02B 6/3849; G02B 6/3851; G02B 6/387; G02B 6/3885
See application file for complete search history.

(56) References Cited

U.S. PATENT DOCUMENTS 6,240,229 B1 5/2001 Roth
6,471,412 B1 10/2002 Belenkiy et al.
(Continued)

FOREIGN PATENT DOCUMENTS

WO WO-2020057528 A1 * 3/2020 ........... G02B 6/3825
WO 2021021575 A1 2/2021
WO 2022197638 A1 9/2022

OTHER PUBLICATIONS

Machine translation of WO 2020/057528 A1. (Year: 2020).*

*Primary Examiner* — Ryan A Lepisto
(74) *Attorney, Agent, or Firm* — Michael L. Leetzow PLLC

(57) ABSTRACT

A fiber optic adapter assembly includes an adapter body, a spring clip and a retention cap attached to the adapter body enclosing each of the spring clip and two shutters. The adapter body has a main opening and a plurality of pivot arms extending away from the main opening and two latch arms, each of the latch arms disposed between a pair of the pivot arms causing gaps between the latch arms and the pivot arms, which are sealed by the retention cap. The spring clip has a plurality of fingers moveably contacting each of shutters, which pivot between a first and second position.

18 Claims, 23 Drawing Sheets

(52) U.S. Cl.
CPC ............ *G02B 6/387* (2013.01); *G02B 6/3849* (2013.01); *G02B 6/3851* (2013.01); *G02B 6/3885* (2013.01)

(56) References Cited

U.S. PATENT DOCUMENTS

| | | | | |
|---|---|---|---|---|
| 6,866,424 | B2 * | 3/2005 | Tanaka ................. | G02B 6/3825<br>385/55 |
| 8,083,547 | B2 * | 12/2011 | Roth .................... | G02B 6/3817<br>439/607.1 |
| 9,453,963 | B2 | 9/2016 | Sato | |
| 9,933,586 | B1 * | 4/2018 | Yang .................... | G02B 6/3825 |
| 10,101,539 | B2 * | 10/2018 | Yang .................... | G02B 6/3849 |
| 10,545,295 | B1 * | 1/2020 | Sato ..................... | G02B 6/3825 |
| 10,802,224 | B2 * | 10/2020 | Wong ................... | G02B 6/3893 |
| 11,237,339 | B2 | 2/2022 | Nguyen et al. | |
| 11,262,510 | B2 | 3/2022 | Wong et al. | |
| 2021/0349268 | A1 | 11/2021 | Lei et al. | |
| 2022/0011520 | A1 * | 1/2022 | Sato ....................... | G02B 6/381 |
| 2022/0197638 | A1 | 6/2022 | Lemay | |

* cited by examiner 54
50
102
100
110
108
106
58
56
54
52

126
124
202
202
122
136
138a
102
130a
184
140a
140b
184
130b
144a
144c
172
172
134a
184
184
120
136
138b
132b
132a
144b
142a
134b
142b
144d 50
102
106
122
124
202
182a
182b
182a
182b
202
140a
130a
140b
130b
108
134a
110
120
134b 106
200
196
198
214
214
194
200

106
212c
212d
216
214
220
220
182a
218
198
196
182a
220
220
214
212a
212b

ADAPTER SHUTTER ASSEMBLY WITH SHUTTER RETENTION CAP

REFERENCE TO RELATED CASE

This application claims priority under 35 U.S.C. § 119 (e) to U.S. provisional application No. 63/161,788 filed on Mar. 16, 2021, the contents of which are hereby incorporated by reference in their entirety.

BACKGROUND OF THE INVENTION

The fiber optic connector industry utilizes adapters for mating fiber optic connectors to form an optical connection. Often, these adapters have shutters on each end for eye safety and/or dust and debris reduction. The shutters close off the mating space inside the adapter and can be opened (automatically or manually) when the connectors are being inserted. One such adapter with a shutter is presented in WIPO Publication No. WO 2020/057528 to Suncall Technologies (SZ) Co., Ltd. of Shenzhen, China.

Typical adapters with shutters, while capable of helping with dust and eye safety issues, are still prone to dust and are not dust proof in their true sense—for example, dust can still enter from the sides of the adapter. Further, many such adapters have challenges such as too many parts (increased cost), difficult assembly due to the size and relative placement of the parts, a need for internal coil springs that bias the shutters, legacy footprint sizes that make it impossible to accommodate small shutters for current technologies, and the like.

SUMMARY OF THE INVENTION

According to one aspect, the present invention is directed to a fiber optic adapter assembly that includes an adapter body having a main opening to receive at least one fiber optic connector, the main opening surrounded circumferentially by a top side, a bottom side, a first side surface and a second side surface between the top side and the bottom side, the first side surface being opposite the second side surface, the adapter body further includes a first pair of pivot arms adjacent the first side surface and extending longitudinally away from the main opening. a second pair of pivot arms adjacent the second side surface and extending longitudinally away from the main opening and a first latch arm between the first pair of pivot arms and a second latch arm between the second pair of pivot arms, wherein the first latch arm is separated from each pivot arm of the first pair of pivot arms by a first gap and the second latch arm is separated from each pivot arm of the second pair of pivot arms by a second gap, a first shutter positioned on one of the first pair of pivot arms and one of the second pair of pivot arms adjacent the top side, a second shutter positioned on the other of the first pair of pivot arms and the other of the second pair of pivot arms adjacent the bottom side, each of the first shutter and the second shutter moveable between an open position and a closed position, a spring clip positioned around a portion of the adapter body, the spring clip including a plurality of fingers moveably contacting each of the first shutter and the second shutter, and a retention cap attached to the adapter body enclosing each of the spring clip, the first shutter and the second shutter, wherein the first shutter and the second shutter pivot at least partially within the retention cap and at least partially at the respective pivot arms in the first and second pairs of pivot arms.

In some embodiments, the retention cap comprises a plurality of inserts to be received in each of the first gap and the second gap of the adapter body such that when assembled, each of the plurality of inserts fully closes the first gap and the second gap.

In some embodiments, the first and second shutters each have a groove to receive a fiber optic ferrule disposed within the at least one fiber optic connector when inserted through the retention cap.

In some embodiments, the retention cap has a key groove to accommodate a key feature on the fiber optic connector.

In yet another aspect, there is a fiber optic adapter assembly that includes an adapter body having an outer surface and an inner surface, the inner surface defining at least in part a main opening between a first side and a second side, the second side receiving a first fiber optic connector, a retention cap attached to the first side of the adapter body and capable of receiving a second fiber optic connector, a spring clip disposed around at least a portion the adapter body and between an inside portion of the retention cap and the adapter body, and a first shutter and a second shutter movably engaging the spring clip, the adapter body and the retention cap.

In some embodiments, the first shutter has a protrusion at a free end thereof, and the second shutter has a recess at a free end thereof to receive the protrusion from the first shutter.

In some embodiments, the spring clip has a projection to be inserted into a corresponding cavity on the adapter body.

In yet another aspect, there is a fiber optic adapter assembly that includes an adapter body having an outer surface and an inner surface, the inner surface defining at least in part a main opening between a first side and a second side, the second side receiving a first multi-fiber ferrule, a retention cap attached to the first side of the adapter body and capable of receiving a fiber optic connector with a second multi-fiber ferrule, a spring clip disposed around at least a portion the adapter body and between an inside portion of the retention cap and the adapter body, and a first shutter and a second shutter movably engaging the spring clip, the adapter body and the retention cap.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
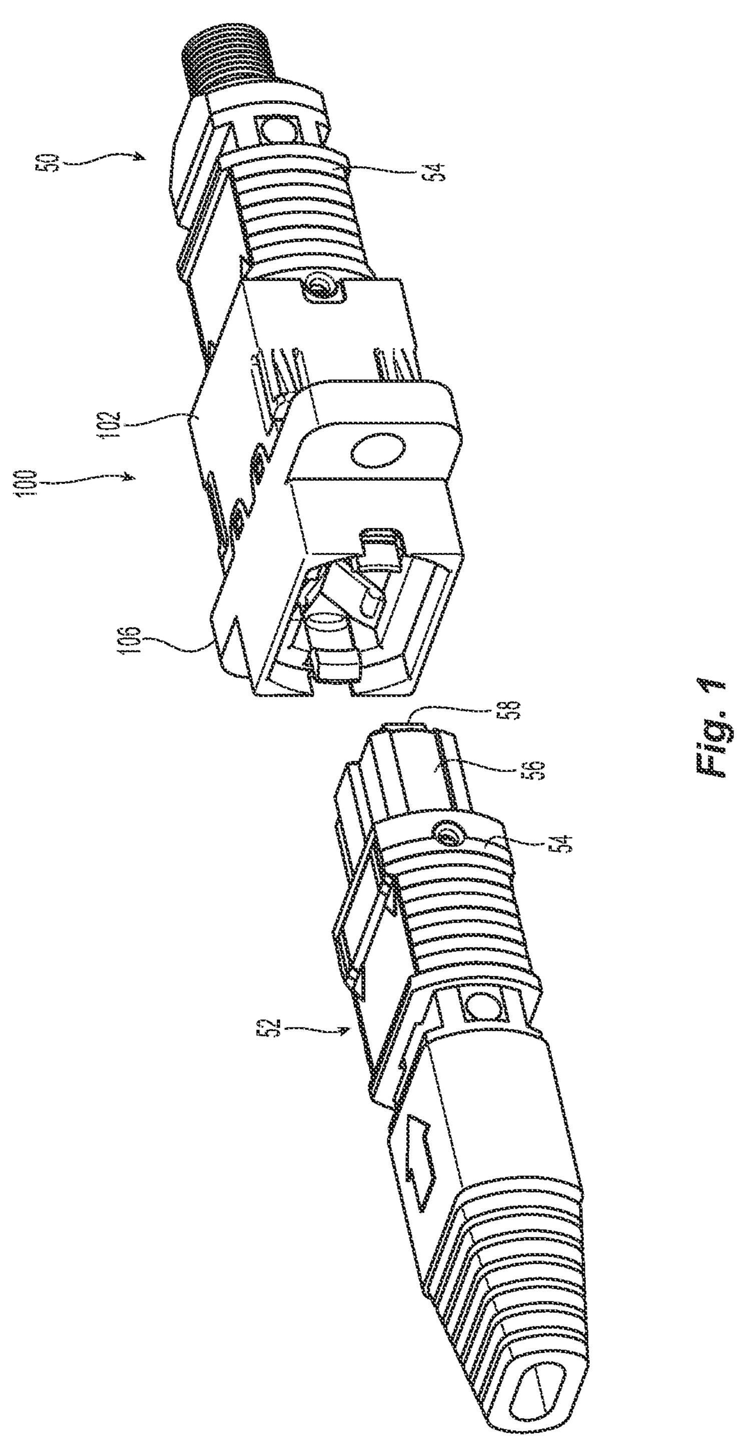
FIG. 1 is a perspective view of one embodiment of an adapter assembly according to the present invention with two MPO fiber optic connectors.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
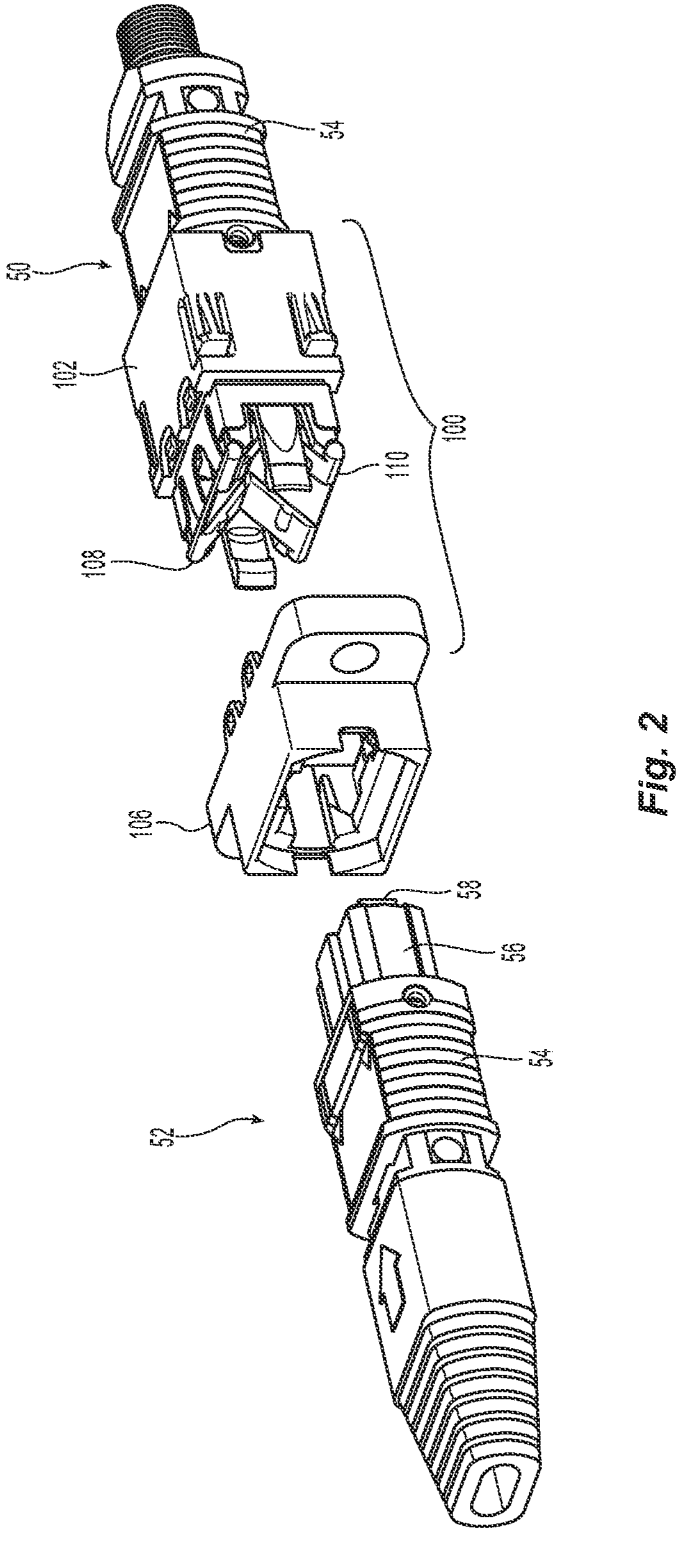
FIG. 2 is an partially exploded perspective view the adapter assembly and two MPO fiber optic connectors in FIG. 1; (if possible, please enlarge this a bit more)
Figure 3:
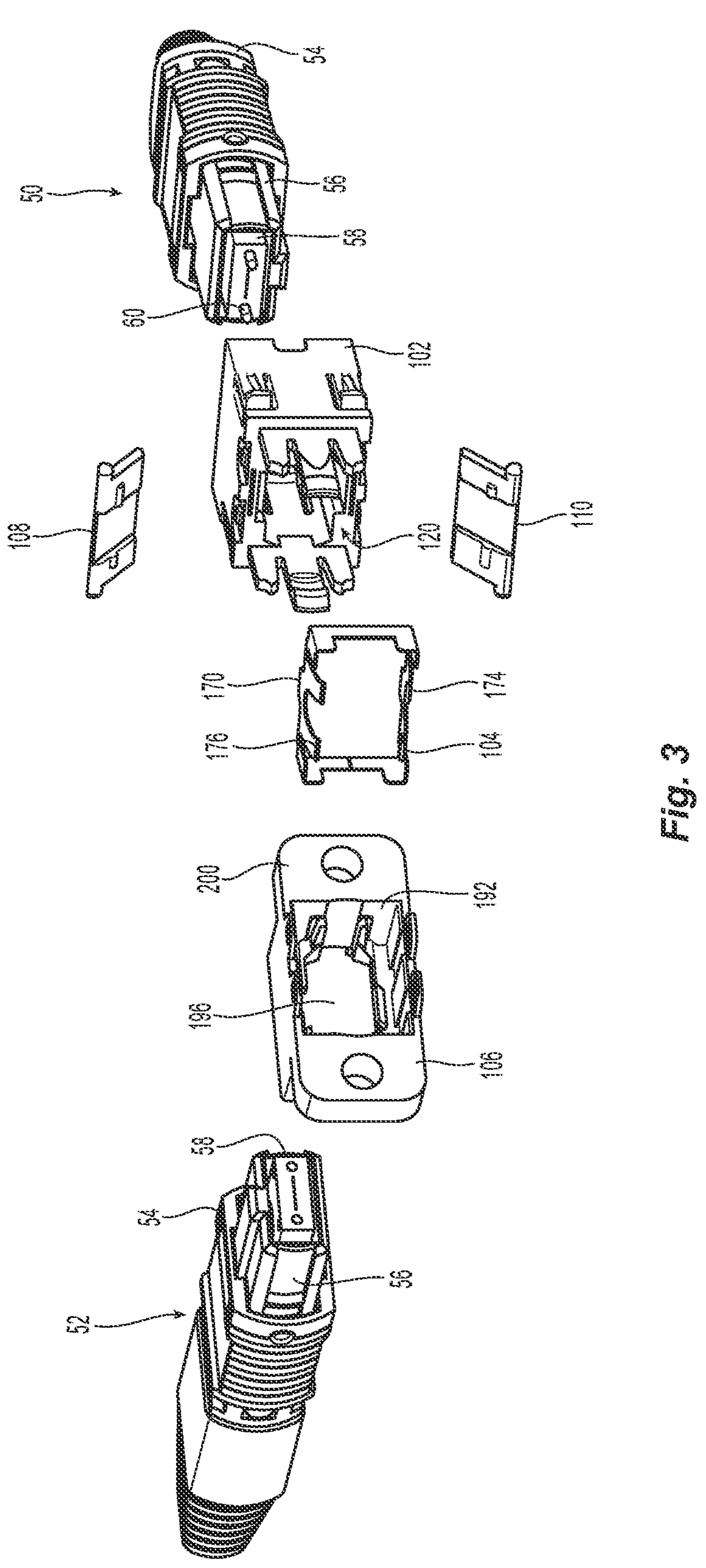
FIG. 3 is an exploded view of the adapter assembly of FIG. 1.
Figure 4:
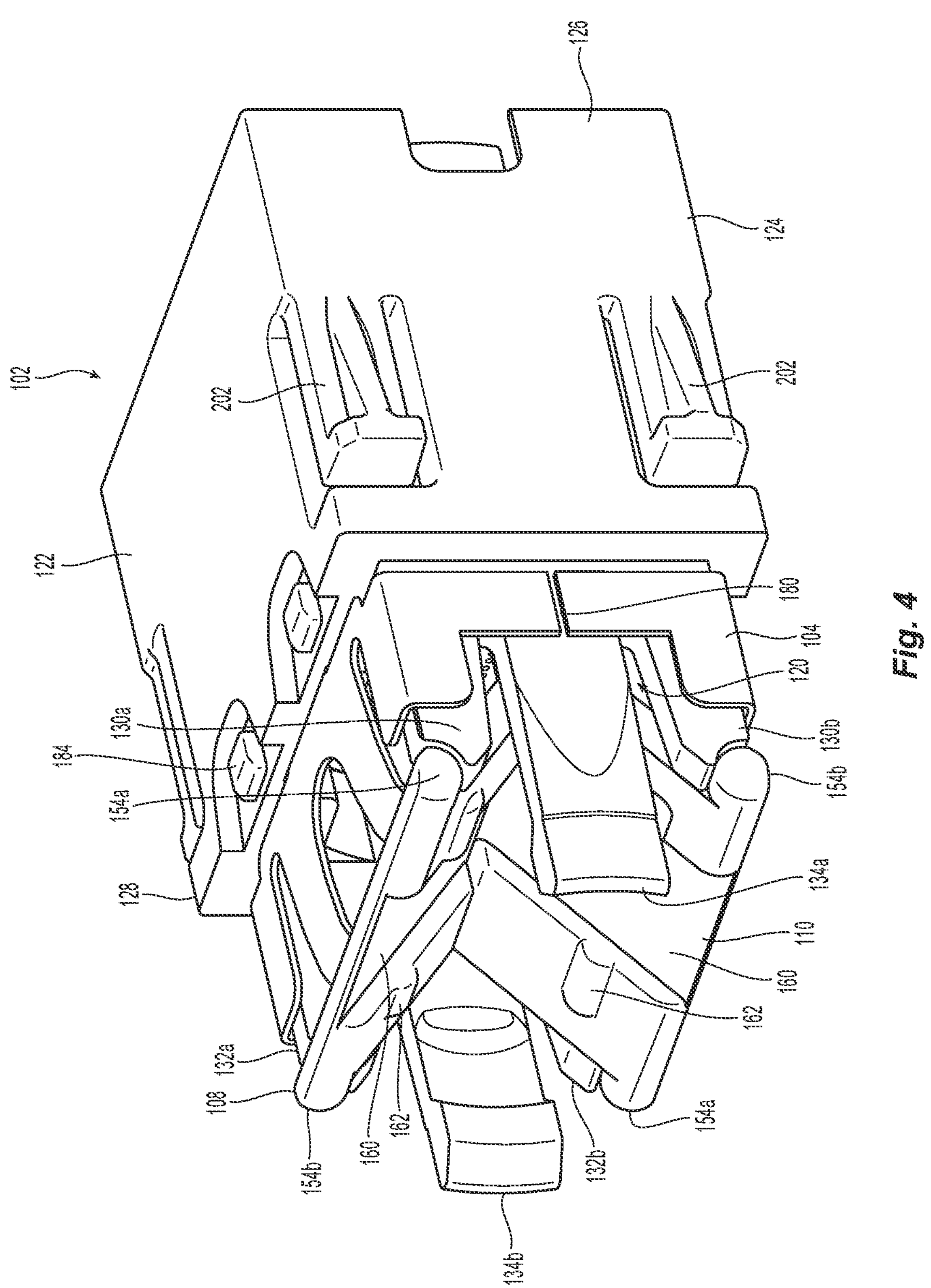
FIG. 4 is an enlarged perspective view of a portion of the adapter assembly in FIG. 1 with shutters disposed therein.
Figures 5A, 5B, 5C:
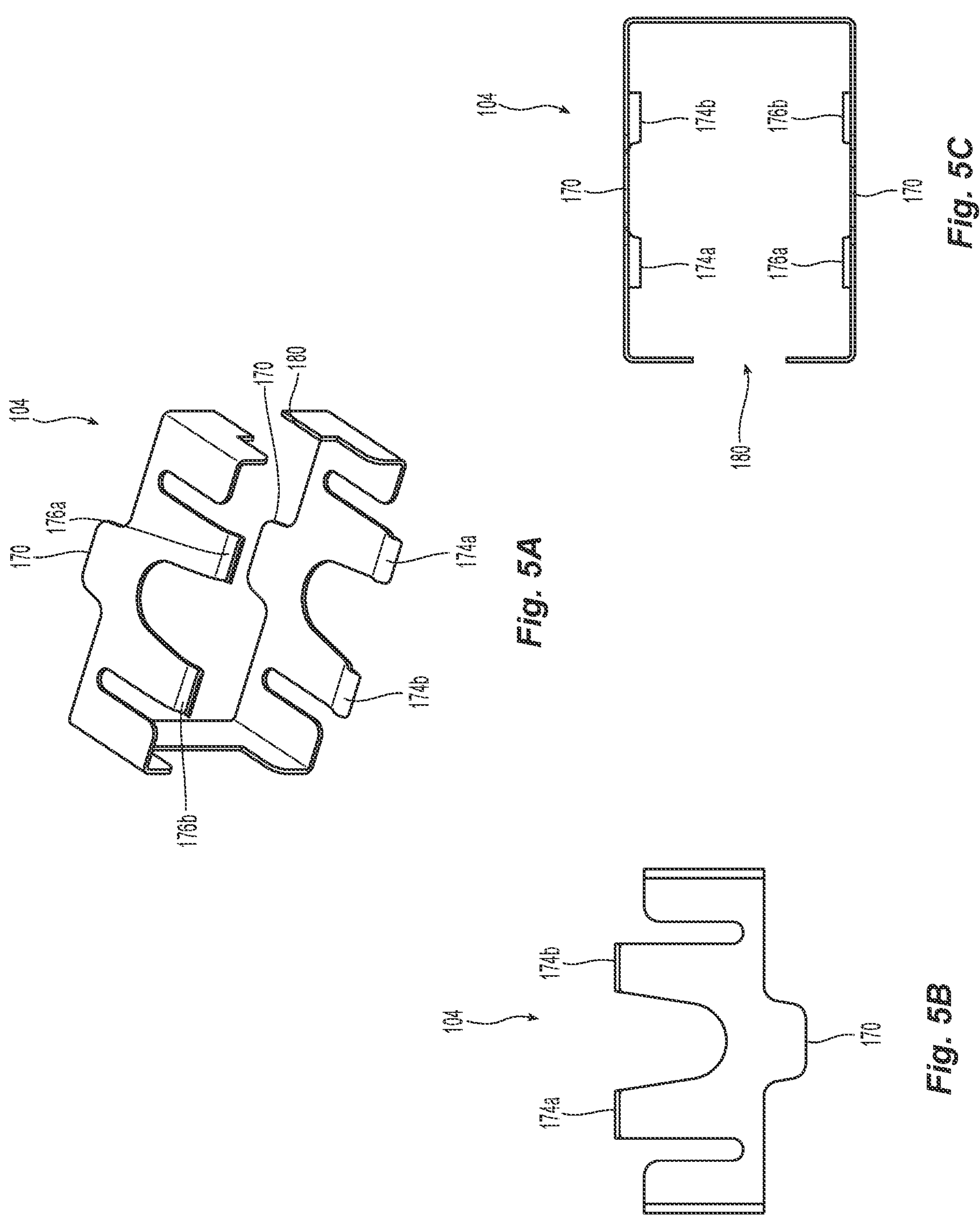
FIG. 5A is a perspective view of a spring clip in the adapter assembly in FIG. 1
FIG. 5B is a top plan view of a spring clip in the adapter assembly in FIG. 1.
FIG. 5C is a front elevation view of the spring clip in FIG. 5A.

Illustrated in FIGS. 1-3 is one embodiment of a fiber optic adapter assembly 100 according to the present invention. This embodiment of the fiber optic adapter assembly 100 may be used with two fiber optic connectors 50 and 52, one having a male configuration 50 and the other having a female configuration 52. See FIG. 3. The fiber optic connectors 50, 52 can be inserted from either side of the fiber optic adapter assembly 100. The fiber optic connectors 50, 52 have an outer housing 54, an inner housing 56, a multi-fiber fiber optic ferrule 58 and, depending on the configuration of the fiber optic connector, guide pins 60. As illustrated herein, the fiber optic adapter assembly 100 preferably includes an adapter body 102, a spring element or spring clip 104 and a retention cap 106. The fiber optic adapter assembly 100 also includes two shutters 108, 110 that are disposed within the fiber optic adapter assembly 100. See FIGS. 2-4 and 8-10.

The adapter body 102 of the fiber optic adapter assembly 100 has a main opening 120 to receive at least one of the fiber optic connectors 50, 52 from each side of the fiber optic adapter assembly 100. The main opening 120 of the adapter body 102 is circumferentially surrounded by a top side 122, a bottom side 124, a first side surface 126 and a second side surface 128. The first side surface 126 and the second side surface 128 function to separate the top side 122 from the bottom side 124 and are on opposing sides of the main opening 120.

Applicant notes that the term “front” or “forward” means that direction where the fiber optic ferrule would be inserted into the fiber optic adapter assembly 100 in the perspective of using the adapter assembly 102. Therefore, in FIGS. 1-3, the front is to the left side of the fiber optic adapter assembly 100 as the right side is typically installed within a panel or other receptacle, and therefore being in the rear or behind the panel.

Figure 6:
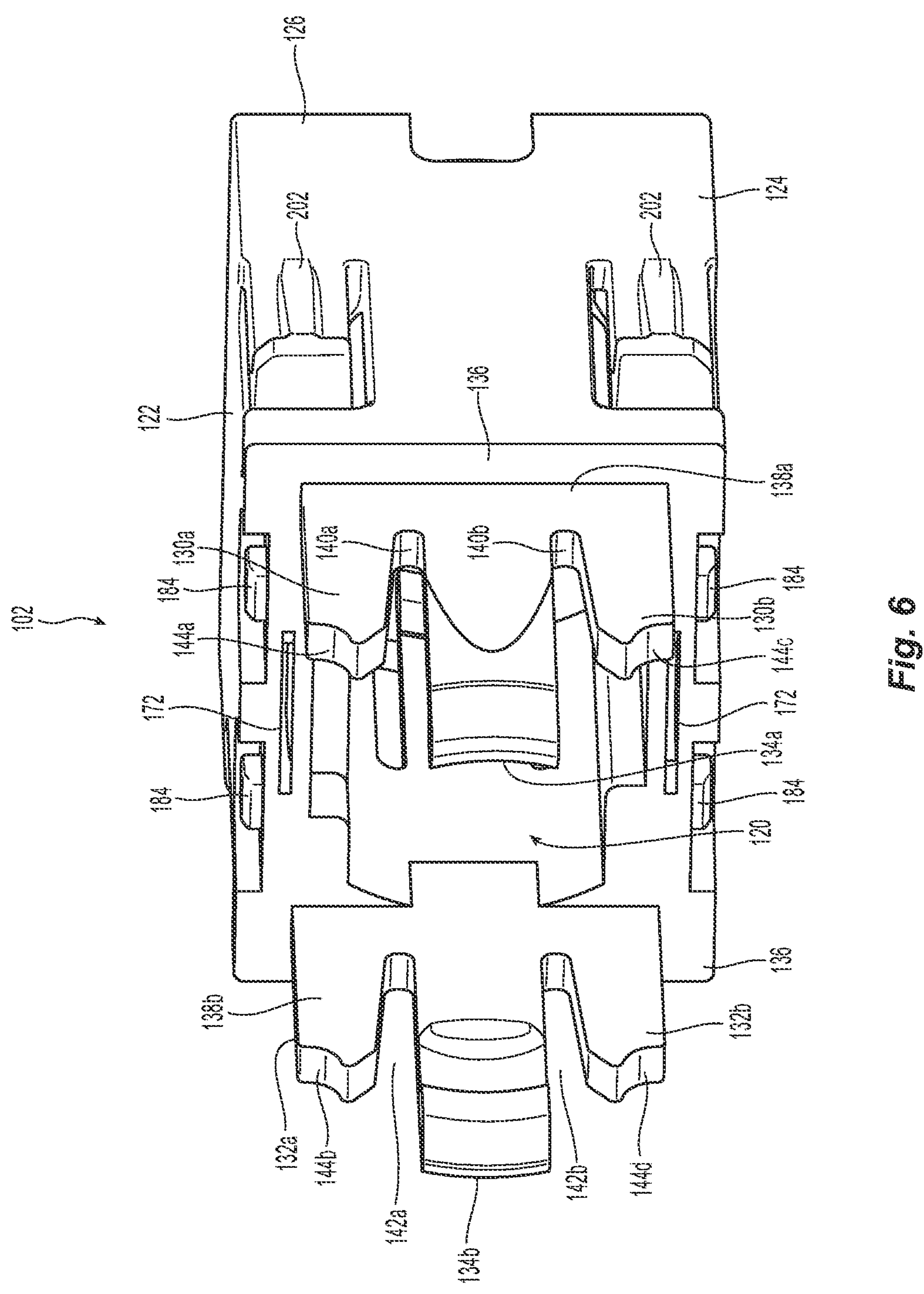
FIG. 6 is a front perspective view of the adapter body of the adapter assembly in FIG. 1.
Figure 7:
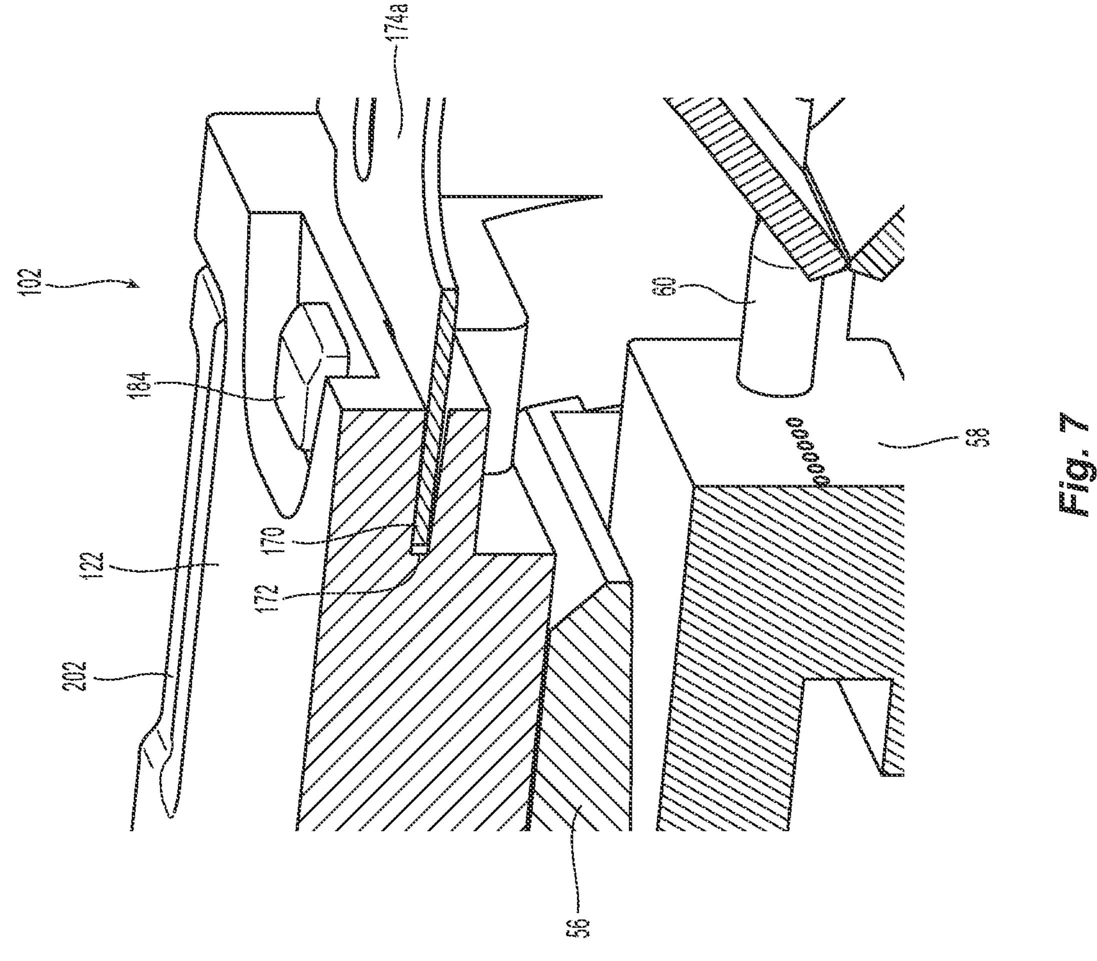
FIG. 7 is a partial cross sectional view of the adapter body and spring clip of the adapter assembly.

The adapter body 102 of the fiber optic adapter assembly 100 has two pair of pivot arms, a first pair of pivot arms 130*a*, 130*b* are adjacent the first side surface 126 and extend away from the main opening 120 and toward the front of the adapter body 102 of the fiber optic adapter assembly 100. The second pair of pivot arms 132*a*, 132*b* are adjacent the second side surface 128 and also extend away from the main opening 120 and toward the front of the adapter body 102 of the fiber optic adapter assembly 100. Disposed between each of the pair of pivot arms is a connector latch arm, a first latch arm 134*a* is disposed between first pair of pivot arms 130*a*, 130*b* and the second latch arm 134*b* is disposed between the second pair of pivot arms 132*a*, 132*b*. The first latch arm 134*a* and the first pair of pivot arms 130*a*, 130*b* extend away from the adapter body 102 and the main opening 120 via a common attachment member 138*a* that extends from a front facing surface 136 of the adapter body 102 that surrounds the main opening 120. See, e.g., FIG. 6. The second latch arm 134*b* and the second pair of pivot arms 132*a*, 132*b* extend away from the adapter body 102 and the main opening 120 via a common attachment member 138*b* that extends from the front facing surface 136 of the adapter body 102 that surrounds the main opening 120. However, the two latch arms 134*a*, 134*b* and the pivots arms 130*a*, 130*b*, 132*a*, 132*b* could each extend directly from the front facing surface 136 independently of one another. See FIGS. 2, 3, and 6. It should therefore be recognized that there is a gap between each of the latch arms and their respective pivot arms. See FIGS. 4, 6, 8, and 11. Specifically, there is a gap 140*a* between the first latch arm 134*a* and one of first pair of pivot arms 130*a*, and a second gap 140*b* between the first latch arm 134*a* and the second of the first pair of pivot arms 130*b*. Likewise, gap 142*a* is between the second latch arm 134*b* and one of second pair of pivot arms 132*a*, and a second gap 142*b* between the second latch arm 134*b* and the second of the second pair of pivot arms 132*b*. As discussed below, the gaps 140*a*, 140*b*, 142*a*, 142*b* are sealed by structures that are within the retention cap 106 to prevent dust and debris from entering the main opening 120. The gaps 140*a*, 140*b*, 142*a*, 142*b* extend behind the shutters 108, 110 when in the fully closed position of the shutters 108, 110.

Each of the pivot arms 130*a*, 130*b*, 132*a*, 132*b* have at a distal end thereof (that is at the free end of the pivot arm) a pivot end 144*a*, 144*b*, 144*c*, 144*d*, respectively. The pivot ends 144*a*, 144*b*, 144*c*, 144*d* are arcuate/curved/semi-circular in configuration. A portion of each of the shutters 108, 110 are disposed within the pivot arms. This allows for rotation of the two shutters 108, 110 within those pivot ends as discussed below. However, in an alternative embodiment, the pivot ends 144*a*, 144*b*, 144*c*, 144*d* may be formed by two planar surfaces instead of the curved surface shown in the figures, for example, to form a V-shaped or L-shaped structure, which a portion of the shutters 108, 110 engages or rests upon.

Figure 8:
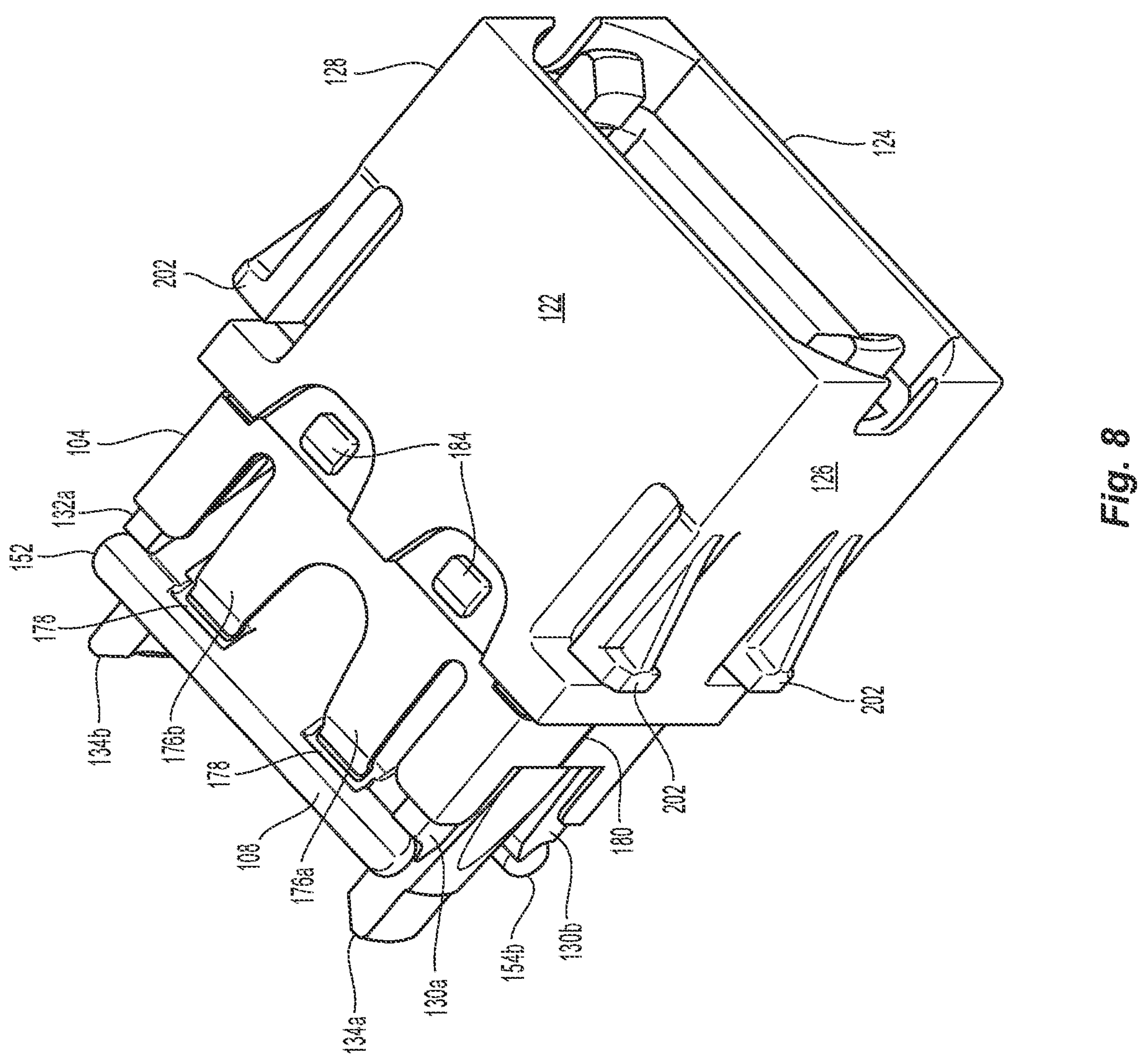
FIG. 8 is another perspective view of the adapter body, spring clip, and shutters of the adapter assembly in FIG. 1.
Figure 9:
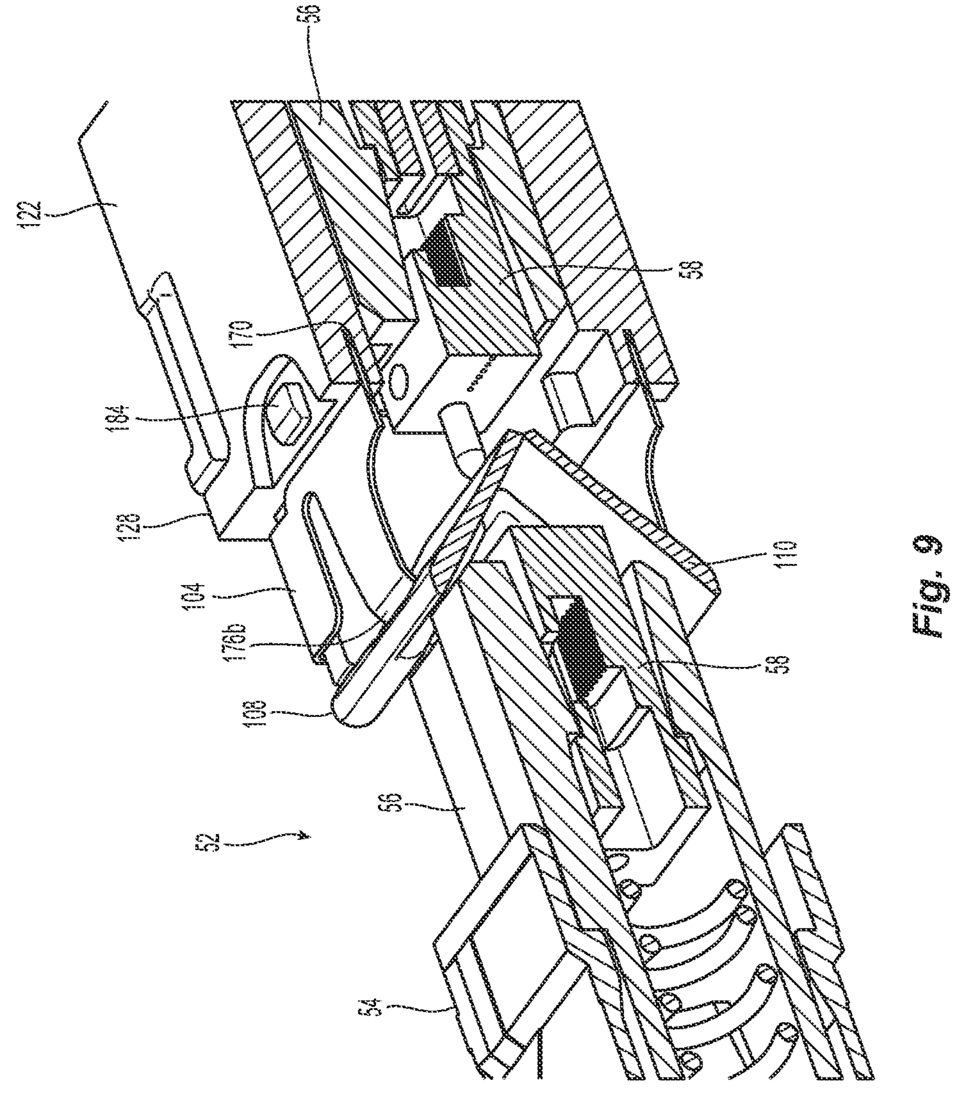
FIG. 9 is a perspective view of the adapter body, spring clip, and shutters of the adapter assembly in FIG. 1 without a retention cap.
Figure 10:
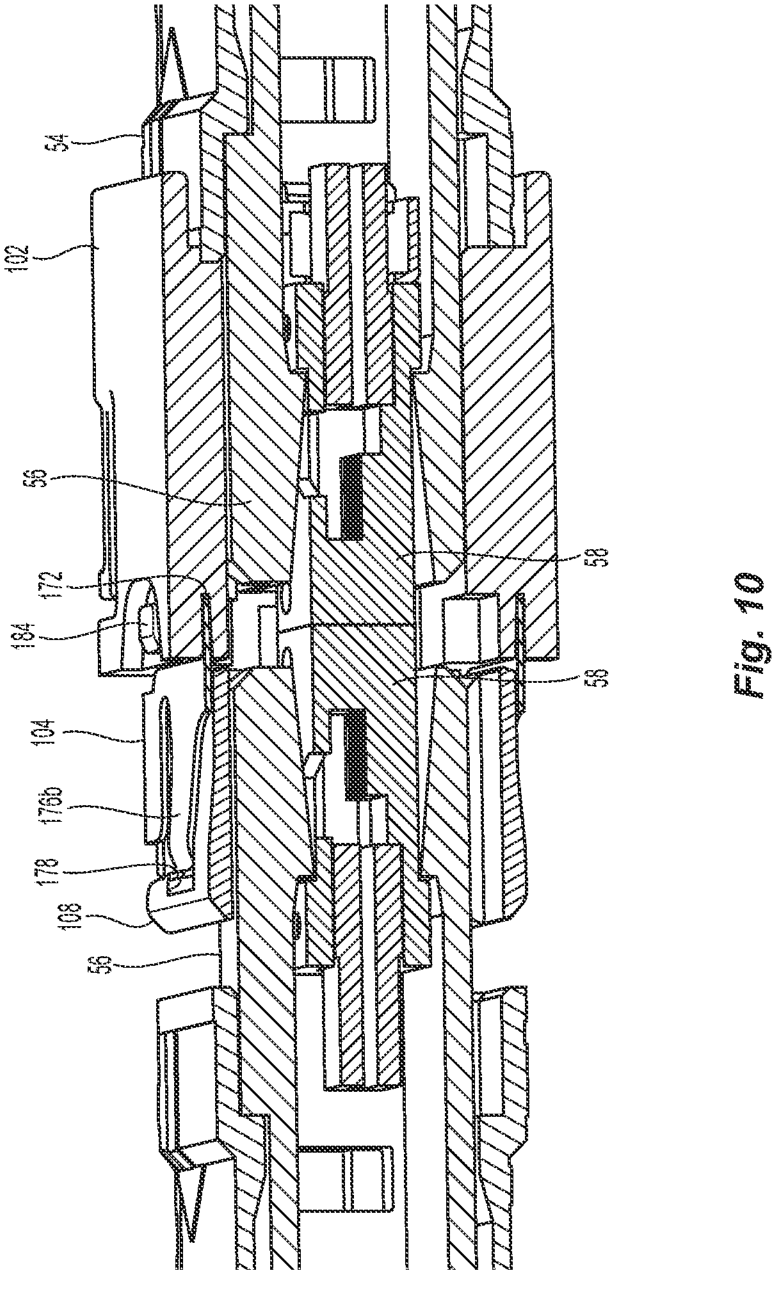
FIG. 10 is a cross section view of the adapter assembly in FIG. 9.
Figure 11:
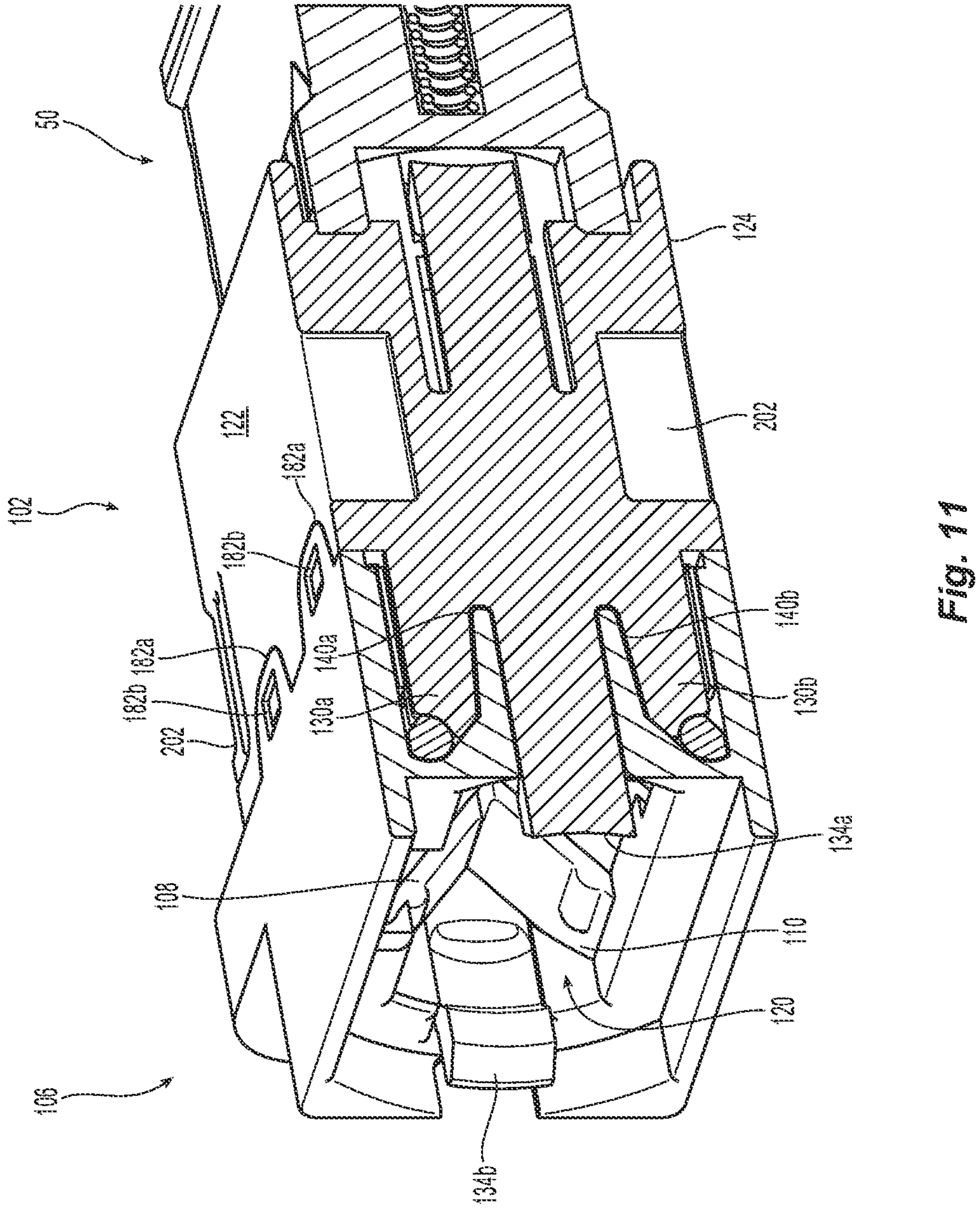
FIG. 11 is a cross section view of the adapter assembly in FIG. 1 and one MPO fiber optic connector inserted into the adapter body.
Figure 19:
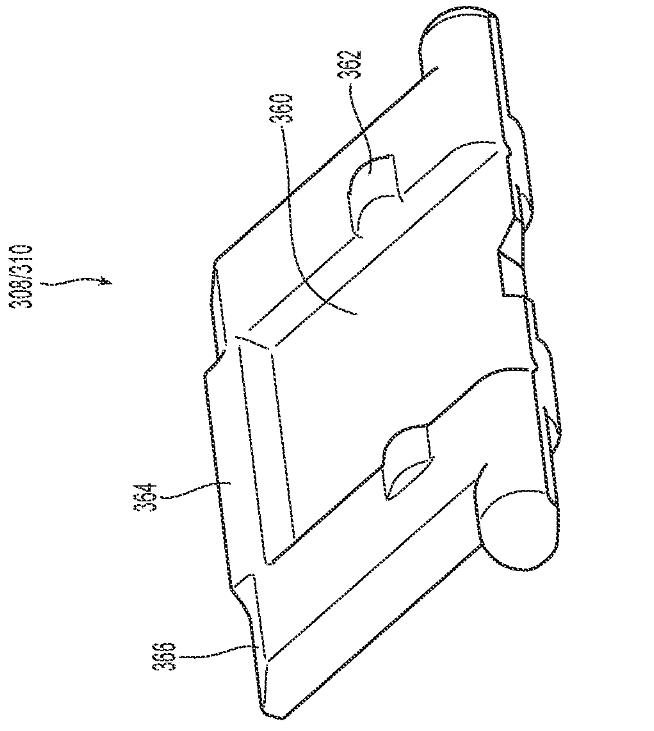
FIG. 19 is a perspective view of an alternative embodiment of a shutter used with the adapter assembly.
Figure 18:
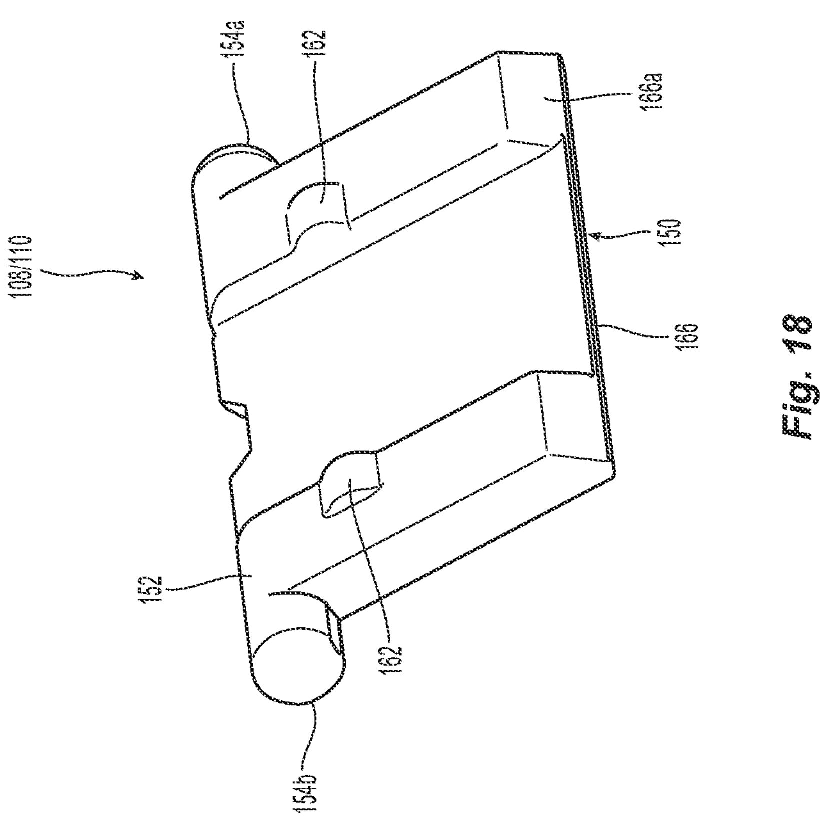
FIG. 18 is a perspective view of a shutter used with the adapter assembly.

As best seen in FIGS. 18,19, but also clearly visible in FIGS. 3, 4, 8, 16, 19, and 24, the two shutters 108, 110 are generally planar and preferably have a central section 150 that is generally rectangular with at least one rounded edge 152 and two cylindrical projections 154*a*, 154*b* extending outward from the central section 150 at the rounded edge 152 in a direction coaxial with the rounded edge 152 and orthogonal to the central section 150. Thus, the two cylindrical projections 154*a*, 154*b* can be considered to be an extension of the at least one rounded edge 152. The two cylindrical projections 154*a*, 154*b* are to be disposed on the pivot ends (e.g. 144*a*, 144*b*, 144*c*, 144*d*) at least partially. As illustrated in FIG. 8, the two cylindrical projections 154*a*, 154*b* of shutter 108 are disposed on the pivot end 144*a* of pivot arm 130*a* and pivot end 144*c* of pivot arm 132*a*, while the two cylindrical projections 154*a*, 154*b* of shutter 110 are disposed on the pivot end 144*b* of pivot arm 130*b* and pivot end 144*d* of pivot arm 132*b*. The shutters 108, 110 are disposed within the pivot arms such that the shutters extend from the pivot arms back toward the main opening 120 of the adapter body 102.

Figure 21:
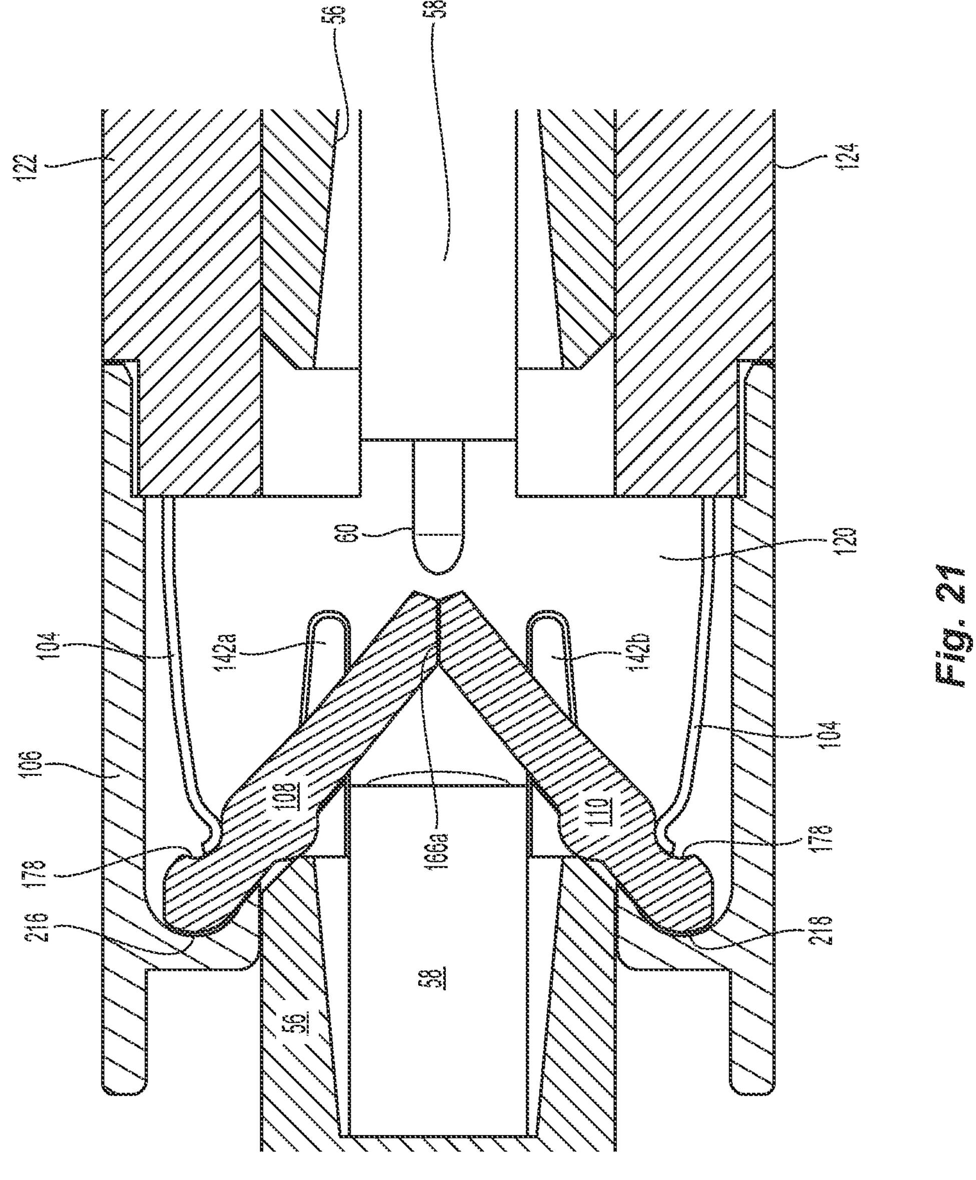
FIG. 21 is a cross sectional view at a mating position within the fiber optic adapter assembly as the female MPO fiber optic connector is inserted.
Figure 22:
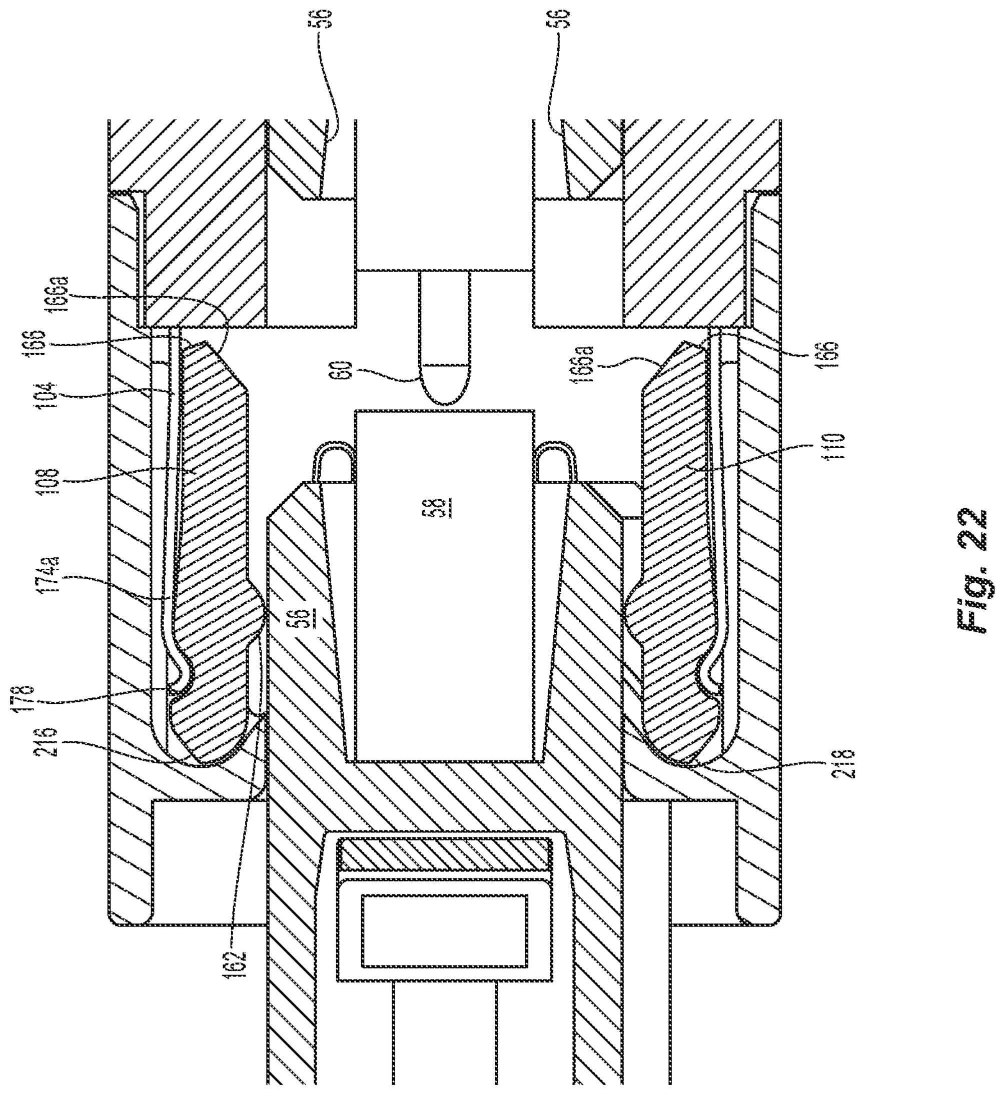
FIG. 22 is a cross sectional view at a mating position within the adapter assembly with the female MPO fiber optic connector fully inserted.
Figure 23:
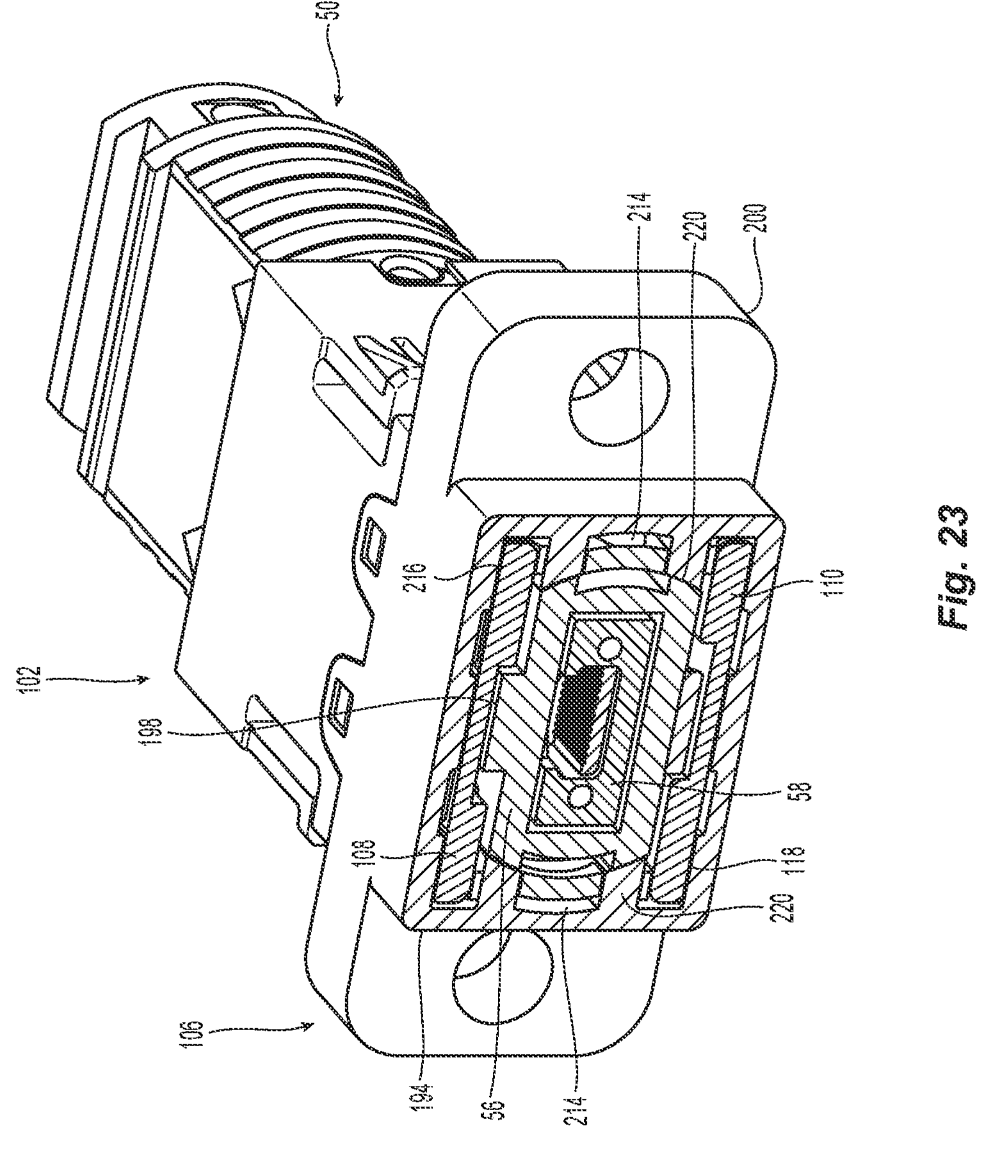
FIG. 23 is a cross sectional view through the retention cap, the fiber optic connector, and a portion of the shutters in the fiber optic adapter assembly.

On at least one side the shutters 108, 110 is a groove 160 that corresponds to the size and shape of a multi-fiber fiber optic ferrule 58. See, e.g., FIG. 18. The groove 160 has a width that can accommodate differently positioned keys in different multi-fiber MPO connector types, e.g., from 8-16 fiber MPO connectors. For example, the key on the housing of a 16 fiber MPO connector is offset from a center of the housing, but the key for an 8 fiber MPO connector is centrally located on the housing (as is known in the art). Thus, the groove 160 could be in a different position of the shutters 108, 110 for different fiber optic connectors. The shutters 108, 110 may also have projections or outwardly extending bumps 162 that are positioned to engage the inner housing 56 as the fiber optic connector 50 is moved into the adapter assembly 100. See FIGS. 21 and 22. With the bumps 162 on both of the shutters 108, 110, they also assist in maintaining the fiber optic connector 50 within the center of the main opening 120 so that it can more easily mate with the other fiber optic connector 52, as they are about to do in FIG. 22. Further, the bumps 162 prevent scratching of the end face of the multi-fiber ferrule 58, which does not contact the shutters 108, 110. At a front edge 166 of the shutters 108, 110 are flat surfaces 166*a* that configured to engage a corresponding surface of the other one of the shutters 108, 110 when the fiber optic connector 50 is not inserted into the main opening 120. The front edge 166 is the distal end of the shutters 108, 110. This engagement prevents the light from the fiber optic connector 52 from exiting out the front end of the adapter assembly 100.

Figure 20:
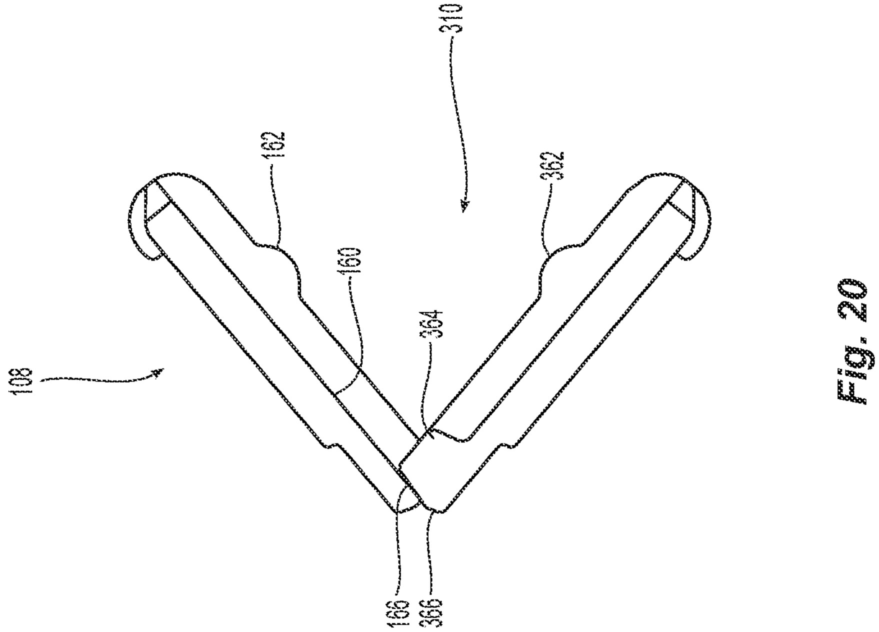
FIG. 20 is a side elevational view of the alternative embodiment of the shutter in FIG. 19 with a shutter from the fiber optic adapter assembly in FIG. 1.

In an alternative embodiment of a shutters 310, as illustrated in FIGS. 19 and 20, there is an insert or protrusion 364 in the groove 360 toward the front edge 366 of the shutter 310. The protrusion 364 may be on one of the other shutters as well. The protrusion 364 is configured to fit within the groove 160 of the other shutter 308 and assists in blocking the light from one of the fiber optic connectors 50, 52, as the shutters are opening or closing. There may be a recess (not shown) provided for the protrusion 364 to engage on the other shutter. The addition of the protrusion 364 provides better eye protection. As seen in FIG. 20, the protrusion 364 extends to the front edge 366 of the shutter 310. As an alternative, it may extend beyond or short of the front edge 366. The shutter 310 may also include the projections or bumps 362.

The fiber optic adapter assembly 100 also includes a spring element or spring clip 104 that at least partially surrounds the adapter body 102 at the front end thereof. The spring element or spring clip 104 is designed to fit around the four pivot arms 130*a*, 130*b*, 132*a*, 132*b* adjacent the front facing surface 136 and therefore has a generally rectangular shape as well. See, e.g., FIGS. 5A-5C, 8. The spring clip 104 preferably has two tabs 170 that extend rearwardly therefrom to engage the adapter body 102. See FIGS. 6, 7, 9, and 15. The tabs 170 are inserted into a tab receptacle 172 in the adapter body 102, preferably at the top side 122 and the bottom side 124 so as not to interfere with the latch arms 134*a*, 134*b* and/or the pivot arms 130*a*, 130*b*, 132*a*, 132*b*. This engagement of the spring clip 104 with the adapter body 102 provides the leverage needed to bias the shutters 108, 110. There are also two sets 174, 176 of two fingers 174*a*, 174*b* and 176*a*, 176*b* extending in a direction opposite the two tabs 170. The two sets fingers 174, 176 each engage one of the shutters 108, 110, which bias the shutters toward a closed position. See FIGS. 8, 9, and 10. There may be recesses 178 in the shutters 108, 110 into which the two sets of fingers 174, 176 are disposed. The recesses 178 in the shutters 108, 110 would be on the opposite side of the shutters 108, 110 from the projections or bumps 162 and the groove 160. While the spring clip 104 is illustrated as one piece, it could be multiple pieces or may be a single piece with a discontinuity 180 (a break) to allow for easier installation on the adapter body 102. See FIGS. 4 and 8. The two sets of fingers 174, 176 do move relative to the shutters 108, 110 during the movement of the shutters 108, 110 as the fiber optic connectors 50, 52 are inserted into and removed from the fiber optic adapter assembly 100. See FIGS. 21 and 22.

The fiber optic adapter assembly 100 includes a retention cap 106. See FIGS. 12-17. The retention cap 106 attaches to the front end of the adapter body 102. See FIGS. 15 and 16. Thus, the retention cap 106 encloses the two shutters 108, 110 and the spring clip 104 within the fiber optic adapter assembly 100. In one way to connect the spring clip 104 to the fiber optic adapter assembly 100, there are tabs 182*a* with openings 182*b* therein extending from two sides of the retention cap 106 to engage posts 184 on the top side 122 and the bottom side 124 of the adapter body 102. See FIGS. 12 and 14B. The posts 184 are preferably recessed into the top and bottom surfaces 122, 124 although that is not a strict requirement. There may be more or fewer of the tabs and openings and posts, depending on the users' choices. As a result, the retention cap 106 is removably attached to the adapter body 102. Other methods of connecting the retention cap 106 to the adapter body 102 could be used as well, even if the components are not removable. Typically, once assembled, the retention cap 106 and the adapter body 102 stay together, and are not easily disassembled without the use of special tools.

Figure 25:
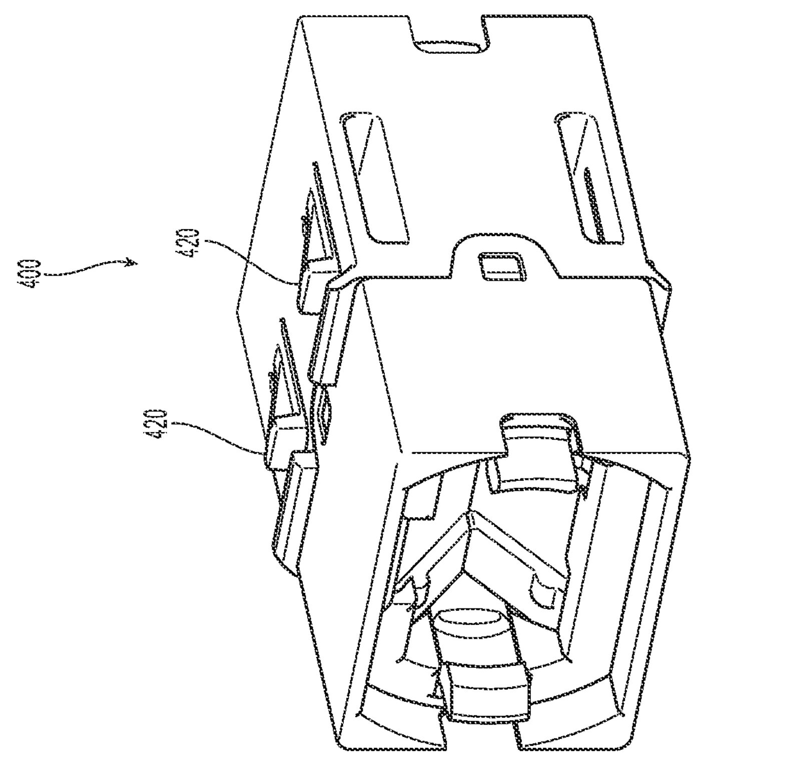
FIG. 25 is a perspective view of another embodiment of an adapter assembly according to the present invention.

The retention cap 106 has an inside surface 190 that defines an opening 192 and an outside surface 194. The fiber optic connector 50 is inserted into the fiber optic adapter assembly 100 through a cap opening 196 and is in communication with the opening 192. The cap opening 196 may have a key groove 198 to ensure that the fiber optic connector 50 is inserted into the fiber optic adapter assembly 100 in the correct orientation (keyed entry). See FIGS. 13 and 14A. The retention cap 106 may also include flanges 200 that extend outward from the outside surface 194. See FIGS. 1 and 14A. The flanges 200 are used to prevent the fiber optic adapter assembly 100 from being pushed through the openings in any panel into which the fiber optic adapter assembly 100 is inserted. The flanges 200 may also be smaller, shorter, or placed on a different side of the retention cap 106. It should be noted that there are also integral flanges 202 on the adapter body 102. The integral flanges 202 are not in communication with the main opening 120. See FIGS. 4, 6, and 8. These integral flanges 202 keep the fiber optic adapter assembly 100 from falling out the front a panel. As is known in the art, the fiber optic adapter assembly 100 is inserted into the opening of a panel with the adapter body 102 being inserted first. The fiber optic adapter assembly 100 is pushed into the panel until the flanges 200 engage the front of the panel. There is a space between the flanges 200 and the integral flanges 202 that corresponds to the thickness of the panel. The integral flanges 202 are discussed in detail in Applicant's pending application Ser. No. 17/669,758, the entire contents of which are incorporated herein by reference. While the integral flanges 202 are on the corners of the adapter body 102, they may also be on only the top side 122 and the bottom side 124. See, e.g., FIG. 25 where another embodiment of a fiber optic adapter assembly 400 is illustrated. In this embodiment, the integral flanges 420 are completely on one side, rather than at the junction of two sides in the above embodiment.

Figure 12:
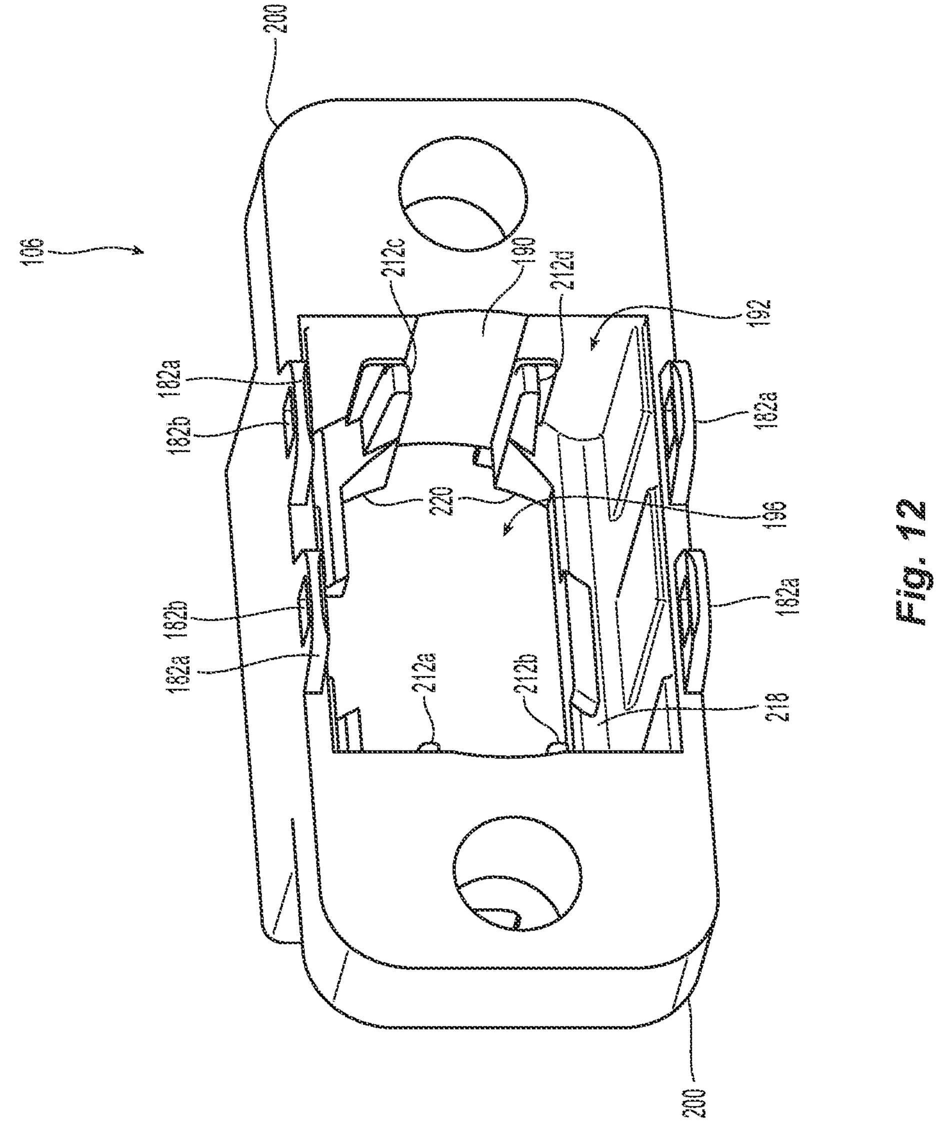
FIG. 12 is a perspective view from the rear of the retention cap in the adapter assembly in FIG. 1.
Figure 13:
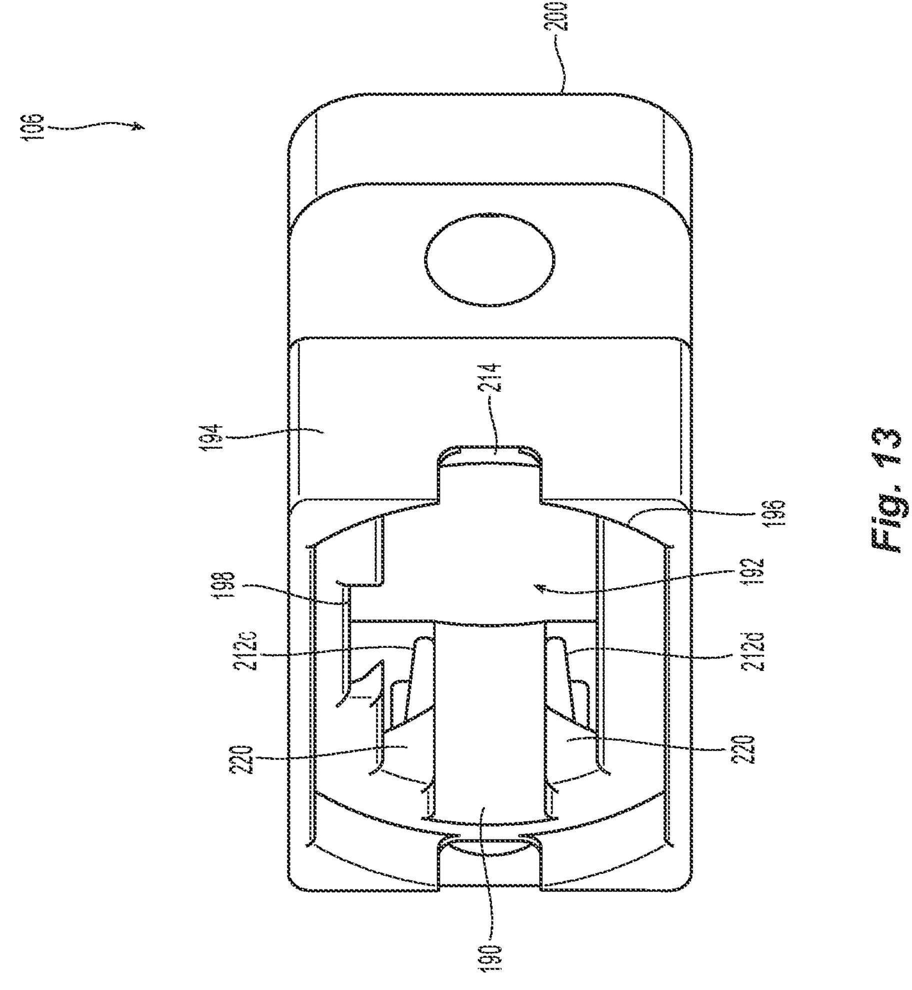
FIG. 13 is a perspective view from the front of the retention cap in the adapter assembly in FIG. 1.
Figures 14A, 14B:
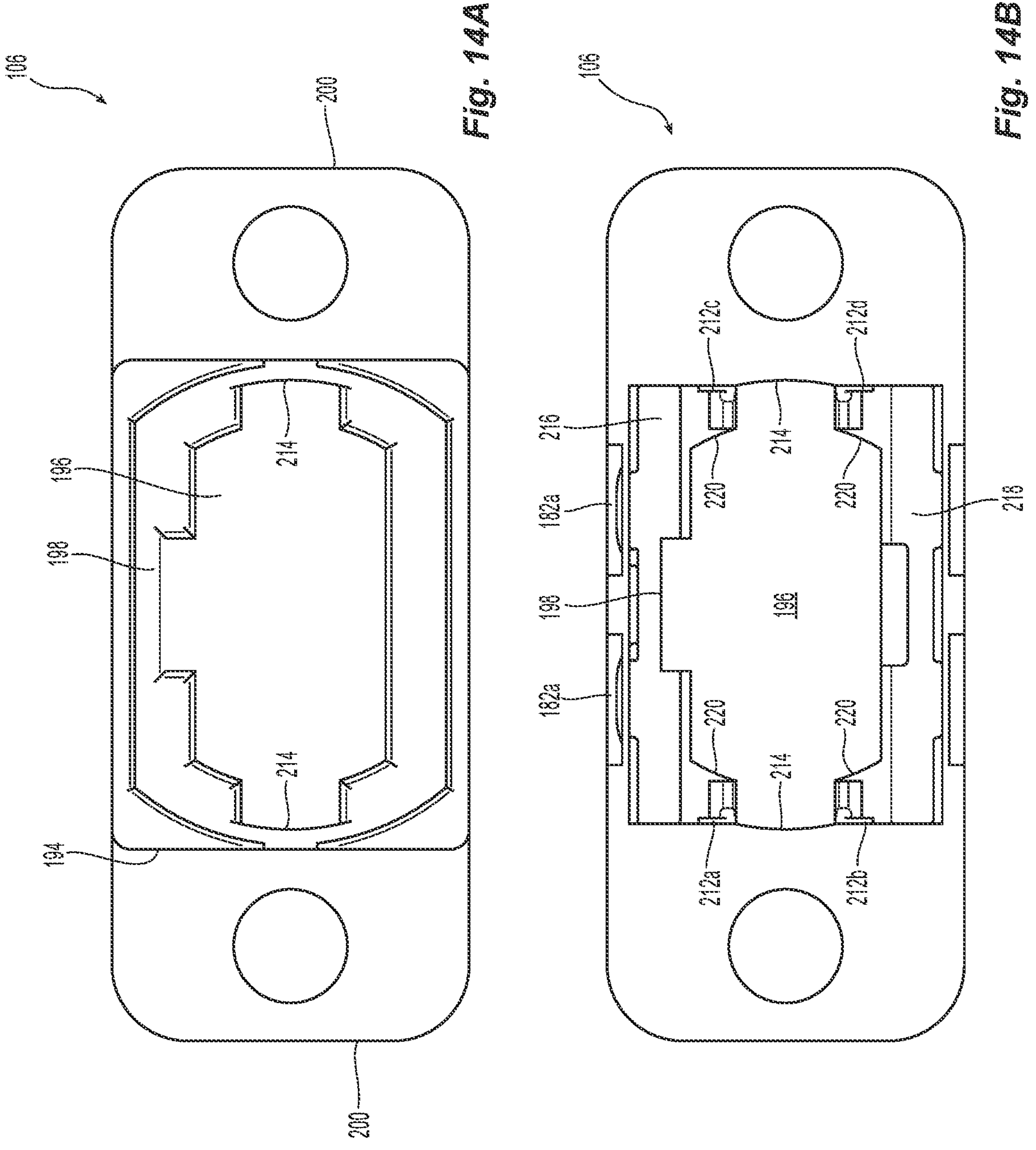
FIG. 14A is an elevational view from the front of the retention cap in the adapter assembly in FIG. 1.
FIG. 14B is an elevational view from the front of the retention cap in the adapter assembly in FIG. 1.
Figure 15:
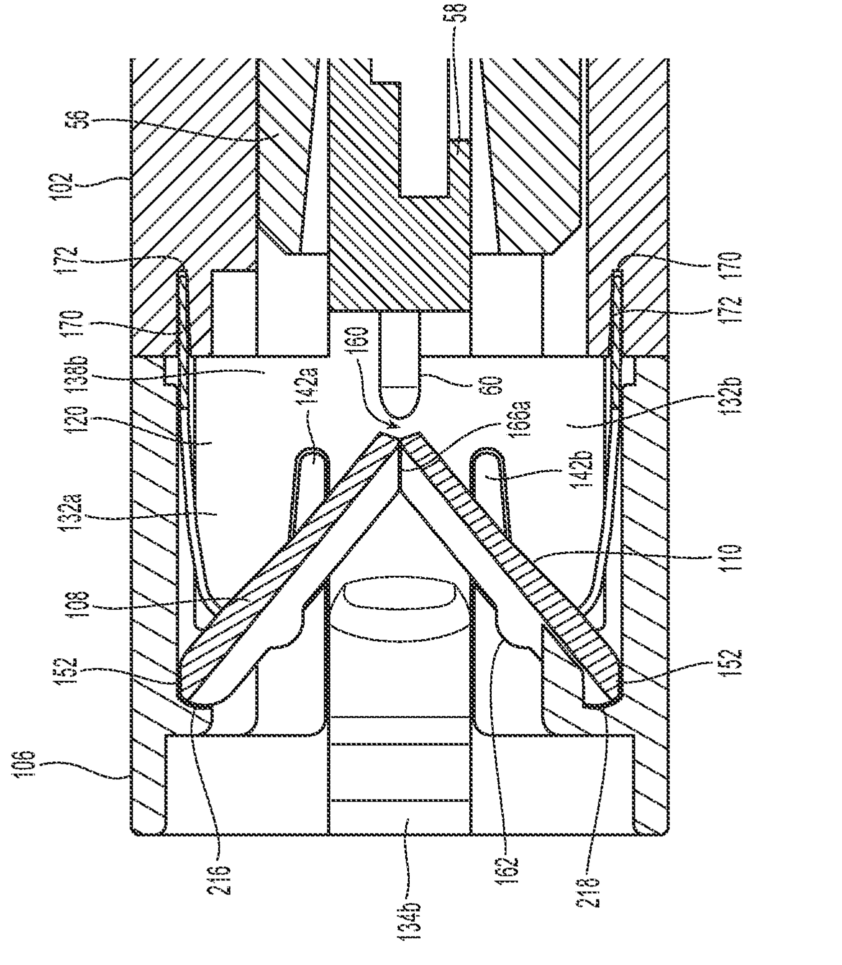
FIG. 15 is a cross sectional view from the side showing the shutters in engagement.
Figure 16:
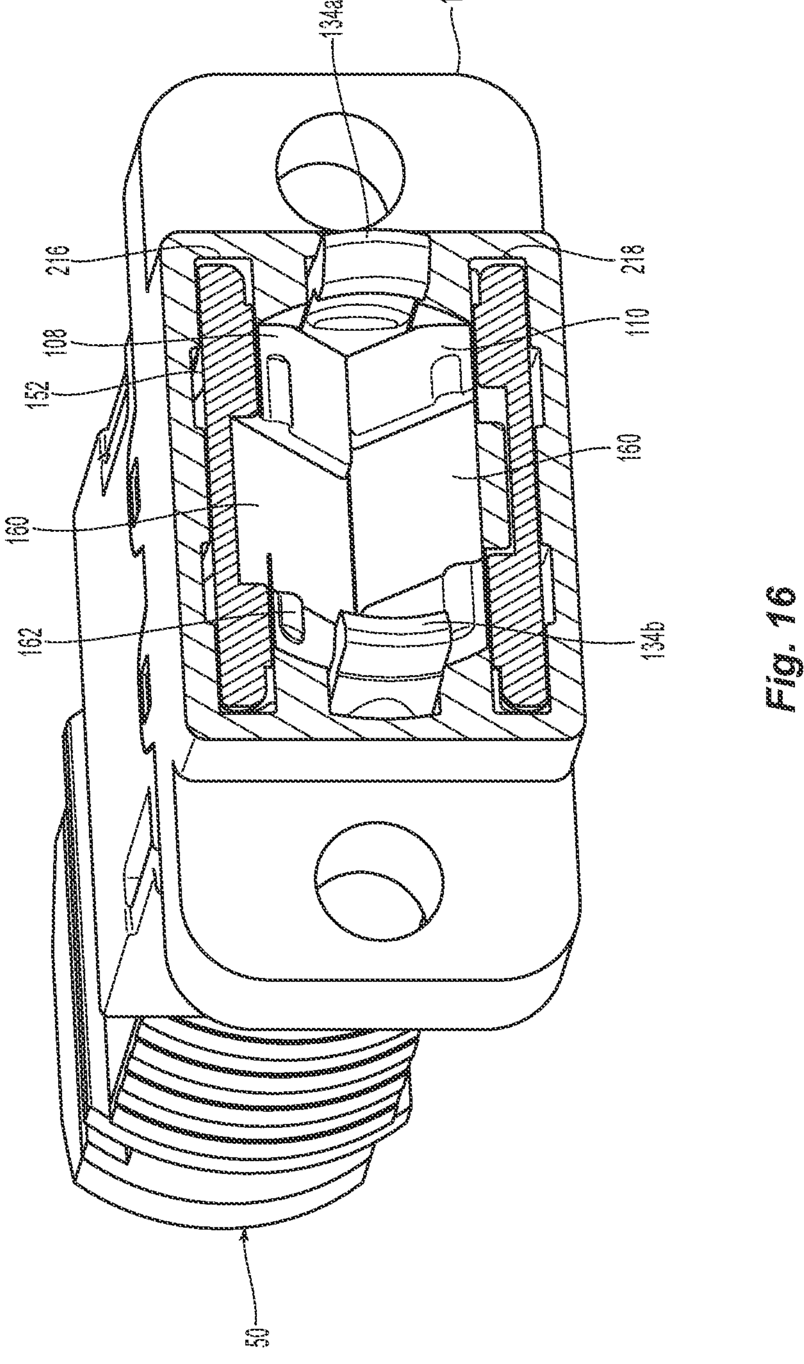
FIG. 16 is a cross sectional view through the retention cap and a portion of the shutters in the adapter assembly.
Figure 17:
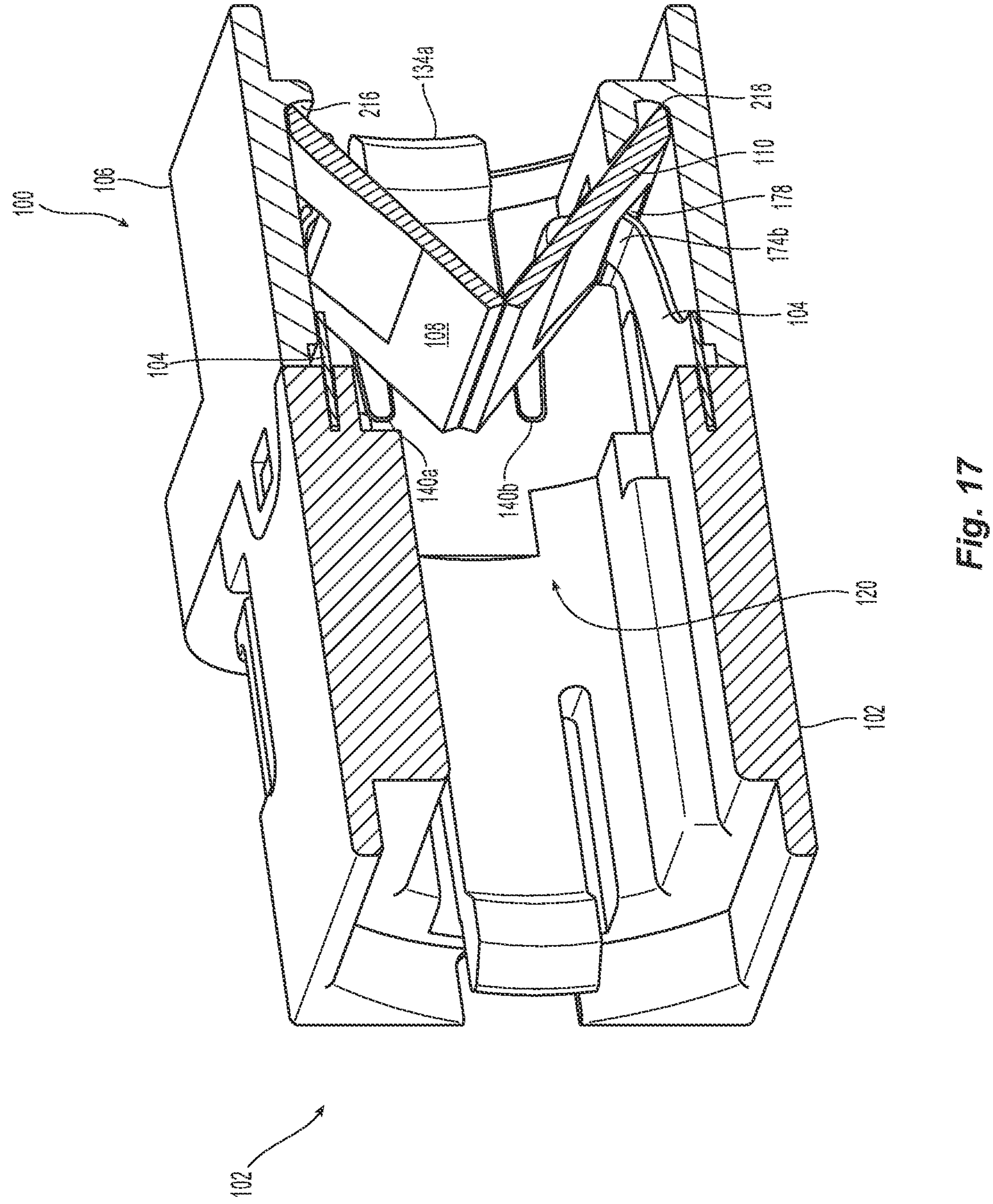
FIG. 17 is a cross sectional view along the length of the adapter assembly.

Within the inside surface 190 are a number of features that are complementary to the features in the adapter body 102. First, there are four cap inserts 212 that extend from the inside surface 190 into the opening 192. As noted above, there are openings or gaps 140*a*, 140*b*, 142*a*, 142*b* between the latch arms 134*a*, 134*b* and the pivot arms 130*a*, 130*b*, 132*a*, 132*b*. See FIGS. 6 and 15. As illustrated in FIGS. 12 and 14B, there are four cap inserts 212*a*, 212*b*, 212*c*, 212*d*, that occupy the space between the gaps 140*a*, 140*b*, 142*a*, 142*b* and the latch arms 134*a*, 134*b* when the retention cap 106 is attached the adapter body 102. As a result, when the retention cap 106 is fully assembled with the adapter body 102, the gaps 140*a*, 140*b*, 142*a*, 142*b* are completely sealed and no dust and/or debris can enter the fiber optic adapter assembly 100.

Between the cap inserts 212 on either side of the opening 192 are grooves 214 to accommodate the latch arms 134*a*, 134*b*. See FIGS. 12 and 13. Toward the front of the opening 192 are receptacles or pivot receptacles 216 and 218 to receive at least a portion of the at least one rounded edge 152 and the two cylindrical projections 154*a*, 154*b* of the shutters 108, 110. See FIGS. 12 and 15. When the retention cap 106 is attached to the adapter body 102, the receptacles 206 and 208 and the pivot arms 130*a*, 130*b*, 132*a*, 132*b* (and the pivot ends 144*a*, 144*b*, 144*c*, 144*d* in particular) retain the shutters within the fiber optic adapter assembly 100 and allow the shutters 108, 110 to rotate as the fiber optic connector 50 is inserted or removed.

The retention cap 106 also has constraint features 220 that extend from the inside surface 190. These constraint features 220 engage the inner housing 56 of the fiber optic connector 50 when it is inserted into the fiber optic adapter assembly 100. The constraint features 220 keep the fiber optic connector 50 from moving horizontally (side-to-side) within the fiber optic adapter assembly 100—just as the shutters 108, 110 and spring clip 104 keep the fiber optic connector 50 from moving vertically within the fiber optic adapter assembly 100 as noted above.

Figure 24:
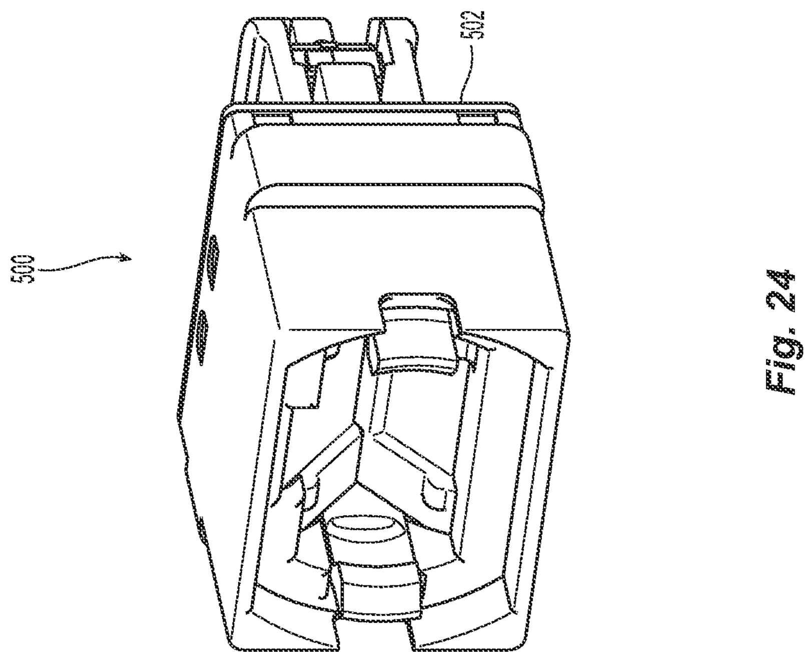
FIG. 24 is a perspective view of another embodiment of an adapter assembly according to the present invention.

In yet another alternative embodiment of a fiber optic adapter assembly 500 the adapter body 502 receives not a fiber optic connector 52, but an MT ferrule on one side. As illustrated in FIG. 24, the adapter body 502 is configured to receive only the MT ferrule (or other fiber optic ferrule) and not the whole connector on the side longitudinally opposite to where the shutters 108, 110 are placed. The interior of the adapter body 402 has similar features as that of the adapter body 102 above: latch arms, pivot arms and pivot ends, etc. The retention cap 106 too is attached to the adapter body 502 in a similar manner as attached to the adapter body 102. The side receiving the MT ferrule may have latches positioned to hold the MT ferrule securely, as described in Applicant's U.S. Pat. No. 11,237,339, the entire contents of which are incorporated by reference herein.

A process to assemble the fiber optic adapter assembly 100 and the fiber optic adapter assembly 500 will now be described with respect to the fiber optic adapter assembly 100, and similar process is followed for the fiber optic adapter assembly 500. The process includes attaching the shutters 108, 110 into respective receptacles 216, 218 of the retention cap 106. In parallel, or at any time prior to attachment of the retention cap 106 to the adapter body 102, the spring clip 104 is attached to the adapter body 102. More specifically, the tabs 170 are inserted into the tab receptacle 172 of the adapter body 102. The adapter body 102 is then brought toward the opening 192. The two latch arms 134*a*, 134*b* are guided into the retention cap 106 by the grooves 214 until the four cap inserts 212*a*, 212*b*, 212*c*, 212*d*, fully seal the space between the gaps 140*a*, 140*b*, 142*a*, 142*b*, and the retention cap 106 engages the front facing surface 136. At this time, part of the rounded edge 152 of the two shutters 108, 110 is seated against the respective receptacles 216, 218 and the remaining part is on the pivot ends 144*a*, 144*b*, 144*c*, 144*d*. Thus, the two shutters 108, 110 are completely inside the assembly of the retention cap 106 and the adapter body 102 forming the fiber optic adapter assembly 100.

According to the present invention there also is a fiber optic adapter assembly comprising an adapter body having a main opening to receive at least one fiber optic connector, the main opening surrounded circumferentially by a top side, a bottom side, a first side surface and a second side surface between the top side and the bottom side, the first side surface being opposite the second side surface, the adapter body further including a first pair of pivot arms adjacent the first side surface and extending longitudinally away from a forward facing surface around the main opening, a second pair of pivot arms adjacent the second side surface and extending longitudinally away from the forward facing surface around the main opening, and a first shutter positioned on one of the first pair of pivot arms and one of the second pair of pivot arms adjacent the top, a second shutter positioned on the other of the first pair of pivot arms and the other of the second pair of pivot arms adjacent the bottom side, each of the first shutter and the second shutter moveable between an open position and a closed position, wherein the fiber optic adapter further including a spring clip positioned around a portion of the adapter body, the spring clip including a plurality of fingers moveably contacting each of the first shutter and the second shutter.

The fiber optic adapter assembly may also have a retention cap attached to the adapter body enclosing the spring clip, the first shutter and the second shutter, wherein the first shutter and the second shutter pivot at least partially within the retention cap and at least partially at the respective pivot arms.

The retention cap may include a plurality of inserts to be received in each of the respective gaps of the adapter body such that when assembled, each of the plurality of inserts fully closes the respective gaps.

The adapter body of the fiber optic adapter assembly may have a first latch arm between the first pair of pivot arms and a second latch arm between the second pair of pivot arms, wherein the first latch arm is separated from each of the first pair of pivot arms by a gap and the second latch arm is separated from each of the second pair of pivot arms by a gap, wherein each of the respective gaps between the first latch arm and the first pair of the pivot arms and the second latch arm and the second pair of pivot arms extends behind each of the first shutter and the second shutter when in the closed position.

The spring clip of the fiber optic adapter assembly fits around the pivot arms rearward of the pivot ends of the pivot arms where the shutters are placed.

The spring clip of the fiber optic adapter assembly is bound by four L-shaped ledges at respective corners thereof that conform to a geometry of the pivot arms.

The shutters of the fiber optic adapter assembly have a pair of recesses in a rear portion thereof that accommodate a relative movement of the fingers of the spring clip as the shutters open and close.

The spring clip of the fiber optic adapter assembly has a skeletal structure with at least one tab at its rearmost part which fits inside a tab receptacle in a tap and/or bottom position of the adapter body.

The fingers of the spring clip of the fiber optic adapter assembly end in arcuate portions adapted to slide within respective recesses of the shutters.

The retention cap of the fiber optic adapter assembly wherein inside a retention cap opening, an inner surface thereof includes the plurality of retention cap inserts on each side to fit into cap insert recesses or gaps of the adapter body, the retention cap inserts start rearwardly from constraint features provided within the retention cap opening, and wherein the cap inserts, when fully inserted inside respective gaps between the pivot arms and the latch arms of the adapter body extend past the fully closed shutters in the direction toward a main opening of the adapter body.

The fiber optic adapter assembly has between the retention cap inserts on each side of an inner surface of the retention cap, a latch arm groove is provided to accommodate respective latch arms from the adapter body.

The fiber optic adapter assembly wherein the retention cap abuts a forward facing surface of the adapter body and is flush therewith all around the periphery of the adapter body.

The shutter of the fiber optic adapter assembly has a generally planar body with a groove along its length having a width that can accommodate differently positioned keys in different multi-fiber MPO connector types.

The pivot arms of the fiber optic adapter assembly are integral with the shutter.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic adapter assembly, comprising:

an adapter body having a main opening to receive at least one fiber optic connector, the main opening surrounded circumferentially by a top side, a bottom side, a first side surface and a second side surface between the top side and the bottom side, the first side surface being opposite the second side surface, the adapter body further including:

a first pair of pivot arms adjacent the first side surface and extending longitudinally away from the main opening;

a second pair of pivot arms adjacent the second side surface and extending longitudinally away from the main opening; and a first latch arm between the first pair of pivot arms and a second latch arm between the second pair of pivot arms, wherein the first latch arm is separated from each pivot arm of the first pair of pivot arms by a first gap and the second latch arm is separated from each pivot arm of the second pair of pivot arms by a second gap;

a first shutter positioned on one of the first pair of pivot arms and one of the second pair of pivot arms adjacent the top side;

a second shutter positioned on the other of the first pair of pivot arms and the other of the second pair of pivot arms adjacent the bottom side, each of the first shutter and the second shutter moveable between an open position and a closed position;

a spring clip that extends around and engages an outer portion of the adapter body, the spring clip including a plurality of fingers moveably contacting each of the first shutter and the second shutter; and a retention cap attached to the adapter body enclosing each of the spring clip, the first shutter and the second shutter, wherein the first shutter and the second shutter pivot at least partially within the retention cap and at least partially at the respective pivot arms in the first and second pairs of pivot arms.

2. The fiber optic adapter assembly according to claim 1, wherein the retention cap comprises a plurality of inserts to be received in each of the first gap and the second gap of the adapter body such that when assembled, each of the plurality of inserts fully closes the first gap and the second gap.

3. The fiber optic adapter assembly according to claim 1, wherein the first gap between the first latch arm and the first pair of the pivot arms and the second gap between the second latch arm and the second pair of pivot arms extend behind each of the first shutter and the second shutter when in the closed position.

4. The fiber optic adapter assembly according to claim 1, wherein each of the first and second shutters have a flat surface at distal ends to engage one another in the closed position.

5. The fiber optic adapter assembly according to claim 1, wherein the first and second shutters each have a groove to receive a fiber optic ferrule disposed within the at least one fiber optic connector when inserted through the retention cap.

6. The fiber optic adapter assembly according to claim 1, wherein the retention cap has openings to receive posts on the adapter body to secure the retention cap to the adapter body.

7. The fiber optic adapter assembly according to claim 1, wherein the adapter body has integral flanges to engage a panel, the integral flanges not being in communication with the main opening.

8. The fiber optic adapter assembly according to claim 1, wherein the retention cap has a key groove to accommodate a key feature on the fiber optic connector.

9. The fiber optic adapter assembly according to claim 1, wherein the first and second shutters have an outwardly extending bump to engage an inner housing of the fiber optic connector to orient the fiber optic connector within the fiber optic adapter assembly.

10. A fiber optic adapter assembly, comprising:

an adapter body having an outer surface and an inner surface, the inner surface defining at least in part a main opening between a first side and a second side, the second side receiving a first fiber optic connector;

a retention cap attached to the first side of the adapter body and capable of receiving a second fiber optic connector;

a spring clip disposed around at least a portion of the outer surface of the adapter body and between an inside portion of the retention cap and the outer surface of the adapter body; and a first shutter and a second shutter movably engaging the spring clip, the adapter body and the retention cap;

wherein the adapter body has a first side surface and a second side surface, and the adapter body further comprises:

a first pair of pivot arms adjacent the first side surface and extending longitudinally away from a forward facing surface around the main opening, each of the first pair of pivot arms having a pivot end; and a second pair of pivot arms adjacent the second side surface and extending longitudinally away from the forward facing surface around the main opening, each of the second pair of pivot arms having a pivot end; and wherein the first shutter is disposed between the pivot end of one of the first pair of pivot arms and a first pivot receptacle in the retention cap, and also between the pivot end of one of the second pair of pivot arms and the first pivot receptacle in the retention cap; and wherein the second shutter is disposed between the pivot end of a second of the first pair of pivot arms and a second pivot receptacle in the retention cap, and also between the pivot end of a second of the second pair of pivot arms and the second pivot receptacle in the retention cap.

11. The fiber optic adapter assembly according to claim 10, wherein the first and second fiber optic connectors are an MPO-type fiber optic connector.

12. The fiber optic adapter assembly according to claim 10, wherein the first shutter has a protrusion at a free end thereof, and the second shutter has a recess at a free end thereof to receive the protrusion from the first shutter.

13. The fiber optic adapter assembly according to claim 10, further comprising a first latch arm and a second latch arm, the first latch arm disposed between one of the first pair of pivot arms and one of the second pair of pivot arms and the second latch arm disposed between the other of the first pair of pivot arms and the other of the second pair of pivot arms.

14. The fiber optic adapter assembly according to claim 13, wherein the first latch arm is separated from each of the first pair of pivot arms by a first gap and the second latch arm is separated from each of the second pair of pivot arms by a second gap.

15. The fiber optic adapter assembly according to claim 14, wherein the retention cap comprises a plurality of inserts to be received in each of the respective first gap and the second gap of the adapter body such that when assembled, each of the plurality of inserts fully closes the respective first gap and the second gap.

16. The fiber optic adapter assembly according to claim 10, wherein the spring clip has a tab to be inserted into a corresponding receptacle on the adapter body.

17. The fiber optic adapter assembly according to claim 10, wherein the spring clip has a plurality of fingers to engage the first shutter and a plurality of fingers to engage the second shutter.

18. A fiber optic adapter assembly, comprising:

an adapter body having an outer surface and an inner surface, the inner surface defining at least in part a main opening between a first side and a second side, the second side receiving a first multi-fiber ferrule;

a retention cap attached to the first side of the adapter body and capable of receiving a fiber optic connector with a second multi-fiber;

a spring clip disposed around at least a portion of the outer surface of the adapter body and between an inside portion of the retention cap and the outer surface of the adapter body; and a first shutter and a second shutter movably engaging the spring clip, the adapter body and the retention cap;

wherein the adapter body has a first side surface and a second side surface, and the adapter body further comprises:

a first pair of pivot arms adjacent the first side surface and extending longitudinally away from a forward facing surface around the main opening, each of the first pair of pivot arms having a pivot end; and a second pair of pivot arms adjacent the second side surface and extending longitudinally away from the forward facing surface around the main opening, each of the second pair of pivot arms having a pivot end; and wherein the first shutter is disposed between the pivot end of one of the first pair of pivot arms and a first pivot receptacle in the retention cap, and also between the pivot end of one of the second pair of pivot arms and the first pivot receptacle in the retention cap; and wherein the second shutter is disposed between the pivot end of a second of the first pair of pivot arms and a second pivot receptacle in the retention cap, and also between the pivot end of a second of the second pair of pivot arms and the second pivot receptacle in the retention cap.

* * * * *